United States Patent
Newman et al.

(10) Patent No.: US 11,496,266 B2
(45) Date of Patent: Nov. 8, 2022

(54) DEMODULATION REFERENCE FOR HIGH BACKGROUND REJECTION IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

(21) Appl. No.: 17/841,061

(22) Filed: Jun. 15, 2022

(65) Prior Publication Data

US 2022/0311578 A1    Sep. 29, 2022

Related U.S. Application Data

(63) Continuation of application No. 17/585,985, filed on Jan. 27, 2022, now Pat. No. 11,387,961.

(60) Provisional application No. 63/272,352, filed on Oct. 27, 2021, provisional application No. 63/234,911, filed on Aug. 19, 2021, provisional application No. 63/220,669, filed on Jul. 12, 2021, provisional application No. 63/214,489, filed on Jun. 24, 2021, provisional application No. 63/210,216, filed on Jun. 14, 2021.

(51) Int. Cl.
*H04L 5/00* (2006.01)
*H04L 27/38* (2006.01)

(52) U.S. Cl.
CPC ............ *H04L 5/0051* (2013.01); *H04L 27/38* (2013.01)

(58) Field of Classification Search
None
See application file for complete search history.

(56) References Cited

U.S. PATENT DOCUMENTS

| | | |
|---|---|---|
| 10,090,980 B2 | 10/2018 | Nammi |
| 10,419,181 B2 | 9/2019 | Xia |
| 10,708,900 B2 | 7/2020 | Popovic |
| 10,833,823 B2 | 11/2020 | Nammi |
| 10,880,164 B2 | 12/2020 | Ghosh |
| 11,165,606 B2 | 11/2021 | Liu |

(Continued)

*Primary Examiner* — Diane L Lo
(74) *Attorney, Agent, or Firm* — Mayer & Williams PC

(57) ABSTRACT

Demodulation references are short messages exhibiting modulation levels of a modulation scheme, to assist the receiver in demodulating a message. Disclosed are short-form demodulation references suitable for pulse-amplitude modulation (PAM) messages in 5G and 6G. Each resource element of the short-form PAM demodulation reference provides two amplitude calibrations, one for each I or Q branch, from which the remaining amplitude levels of the modulation scheme can be readily calculated in real-time. The receiver can then demodulate a message by matching the branch amplitude values of each message element to the calibrated amplitude levels as determined from the demodulation reference. To indicate the start and end of the message, different configurations can be placed before and after the message. To mitigate high levels of background, a short single-symbol demodulation reference can be embedded in the message at multiple positions. Configurations are suitable for adoption as a demodulation standard.

20 Claims, 9 Drawing Sheets

(56) References Cited

U.S. PATENT DOCUMENTS

| | | | |
|---|---|---|---|
| 2007/0297534 A1* | 12/2007 | Okunev | H04L 27/362 |
| | | | 340/10.52 |
| 2012/0106473 A1 | 5/2012 | Tiirola | |
| 2015/0282124 A1 | 10/2015 | Miao | |
| 2016/0119901 A1 | 4/2016 | Zhang | |
| 2017/0230156 A1 | 8/2017 | Fakoorian | |
| 2018/0242307 A1 | 8/2018 | Chen | |
| 2019/0200326 A1 | 6/2019 | Shin | |
| 2020/0021414 A1 | 1/2020 | Ding | |
| 2020/0145869 A1 | 5/2020 | Nammi | |
| 2020/0259693 A1 | 8/2020 | Baldemair | |
| 2020/0313818 A1 | 10/2020 | Wu | |
| 2021/0022117 A1 | 1/2021 | Yi | |
| 2021/0045160 A1 | 2/2021 | Irukulapati | |
| 2021/0105117 A1 | 4/2021 | Abdelghaffar | |
| 2022/0217763 A1* | 7/2022 | Oviedo | H04W 16/14 |

* cited by examiner

DEMODULATION REFERENCE FOR HIGH BACKGROUND REJECTION IN 5G AND 6G

PRIORITY CLAIMS AND RELATED APPLICATIONS

This application is a continuation of U.S. patent application Ser. No. 17/585,985, entitled "Short-Form Demodulation Reference for Improved Reception in 5G and 6G", filed Jan. 27, 2022, which claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/234,911, entitled "Short Demodulation Reference for Improved Reception in 5G", filed Aug. 19, 2021, and U.S. Provisional Patent Application Ser. No. 63/272,352, entitled "Sidelink V2V, V2X, and Low-Complexity IoT Communications in 5G and 6G", filed Oct. 27, 2021, all of which are hereby incorporated by reference in their entireties.

FIELD OF THE INVENTION

Disclosed are procedures and formats for a short-form demodulation reference for low-complexity communication in a high-density 5G/6G wireless network.

BACKGROUND OF THE INVENTION

A demodulation reference is a message that specifically exhibits modulation states of a modulation scheme (as opposed to data), and thereby assists the receiving entity in demodulating a subsequent message which is modulated according to the same modulation scheme. In 5G and 6G, the primary demodulation reference is a DMRS (demodulation reference signal) which is configured according to one of a number of pseudorandom sequences according to a complex formula. However, some user devices may have difficulty processing such 5G and 6G requirements, or accommodating the bulky DMRS in their messages. In addition, the fluctuating interference background in high-density wireless environments, such as a dense urban area or an automated factory environment, may cause demodulation faults, resulting in missed calls, reduced reliability, and time-consuming retransmissions. What is needed is a demodulation reference configured for use by reduced-capability devices and high-performance users alike, suitable for messaging in both low-density and high-density wireless traffic environments.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for demodulating a message comprising message elements, each message element modulated according to a modulation scheme comprising pulse-amplitude modulation ("PAM"), wherein the modulation scheme comprises integer Namp amplitude levels, each amplitude level comprising one of the predetermined amplitudes of the modulation scheme, the method comprising: receiving a demodulation reference comprising integer Nref reference elements, Nref less than or equal to four, each reference element modulated according to the modulation scheme; determining, for each reference element, a reference I-branch signal and a reference Q-branch signal at 90 degrees phase relative to the reference I-branch signal; determining the Namp amplitude levels of the modulation scheme according to the reference I-branch signals and the reference Q-branch signals; receiving the message; for each message element, determining a message I-branch amplitude value and determining which of the Namp amplitude levels most closely matches the message I-branch amplitude value, and determining a message Q-branch amplitude value and determining which of the Namp amplitude levels most closely matches the message Q-branch amplitude value; whereby each amplitude "level" is one of the amplitudes within a modulation scheme as provided by the reference I-branch and reference Q-branch signals or combinations thereof, and each amplitude "value" is an amplitude of a particular message element as measured by a receiver.

In another aspect, there is non-transitory computer-readable media in a wireless receiver containing instructions that when executed by a computing environment cause a method to be performed, the method comprising: receiving a first demodulation reference comprising exactly one reference element, the reference element modulated according to a pulse-amplitude modulation ("PAM") modulation scheme, the modulation scheme comprising integer Namp amplitude levels including a largest positive amplitude level and a largest negative amplitude level; determining, according to the first demodulation reference, a first reference I-branch signal and a first reference Q-branch signal at 90 degrees phase relative to the first reference I-branch signal; determining the largest positive amplitude level according to one signal, of the first reference I-branch and Q-branch signals; determining the largest negative amplitude level according to the other signal, of the first reference I-branch and Q-branch signals; and determining at least one additional amplitude level by interpolating between the largest positive and negative amplitude levels.

In another aspect, there is a wireless communication device configured to: receive a demodulation reference comprising integer Nref resource elements, Nref greater than 1 and less than 5, each resource element modulated according to a pulse-amplitude modulation ("PAM") modulation scheme, the modulation scheme comprising integer Namp amplitude levels; determine, according to the Nref reference elements, Nref I-branch signals and Nref Q-branch signals, the Q-branch signals offset by 90 degrees in phase from the I-branch signals; determine, according to the Nref I-branch signals and the Nref Q-branch signals, a plurality of the amplitude levels of the modulation scheme; determine, from the plurality of the amplitude levels so determined, one or more additional amplitude levels of the modulation scheme; receive a message comprising message elements modulated according to the PAM modulation scheme, each message element comprising a message I-branch amplitude value and a message Q-branch amplitude value; and compare each message I-branch amplitude value and each message Q-branch amplitude value to the Namp amplitude levels of the modulation scheme, and therein determine which amplitude level, of the Namp amplitude levels of the modulation scheme, most closely matches each message I-branch amplitude value and each message Q-branch amplitude value.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

Figure 1A:
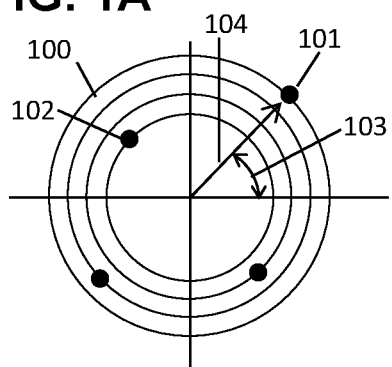
FIG. 1A is a schematic sketch showing an exemplary embodiment of a phase chart for a 4-point short-form demodulation reference, according to some embodiments.

DETAILED DESCRIPTION 5G and 6G technologies are designed for eMBB (enhanced Mobile Broadband communications), URLLC (ultra reliable low latency communications), and mMTC (massive machine-type communication) generally involving large numbers of user devices such as vehicles, mobile phones, self-propelled and robotic machines, portable and stationary computers, and many other advanced wireless instruments. However, many future IoT (internet of things) use cases are expected to involve simple, low-cost, reduced-capability MTC (machine-type communication) wireless devices. For example, a temperature sensor or a door alarm or a timer, among innumerable other task-based wireless products, may include a low-cost processor such as a small microcontroller or an ASIC (application-specific integrated circuit) and may have minimal wireless communication needs. Future automated factories are expected to use large numbers of such single-purpose wireless devices in a high-density communication environment. Reduced-capability processors may have difficulty performing complex 5G/6G procedures, which were developed for highly competent devices that require high-performance communication services. Because both high-performance and reduced-capability devices share the same, limited electromagnetic spectrum, it would be tragic if the simpler machine-type applications are forced to develop a separate wireless technology, competing with 5G and 6G for bandwidth and locations. A much more efficient solution is to include, in 5G and 6G, a set of simpler protocols and defaults appropriate for the low-cost, low-demand MTC devices. Experience with 4G has shown that incorporating such flexibility into an already established radio-communication technology is difficult. Therefore, if 5G and 6G are to make accommodation for reduced-capability systems in IoT applications, appropriate procedures and options should be incorporated as early in the development as possible.

A related problem pertains to interference in high-density wireless environments where thousands or millions of devices are in radio range of each other, such as an urban center or a highly automated manufacturing center. Background interference from the sea of electromagnetic signaling may cause frequent modulation distortions in each message, degrading reliability, causing message faults, interruptions, delays, and missed calls, leading to severely limited network throughput. Moreover, the retransmissions resulting from such faults will contribute further to the overall background, making the underlying problem even worse. Interference is intrinsically bursty and frequency-rich, that is, fluctuating rapidly in both time and frequency. Demodulation references can mitigate the interference problem by updating the current amplitude and phase modulation levels to compensate for the current interference effects, and may thereby assist in demodulating a subsequent message accurately despite interference.

The motivation behind the present disclosure is to provide a demodulation reference option, suitable for both high-performance and low-cost devices, in sparse rural as well as dense urban/industrial wireless environments. Disclosed herein are short, low-complexity demodulation references configured to enable user devices to modulate and demodulate messages in 5G and 6G networks. Systems and methods disclosed herein (the "systems" and "methods", also occasionally termed "embodiments" or "arrangements", generally according to present principles) can provide urgently needed wireless communication protocols to reduce messaging complexity and delays, facilitate low-complexity demodulation, enable more frequent demodulation calibration in noisy environments, and provide readily available options to accommodate reduced-capability user devices, according to some embodiments.

Message demodulation includes receiving a demodulation reference and a message, then determining the modulation state of each message element according to amplitude and phase levels indicated in the demodulation reference. The message may be rendered in a numerical sequence that a processor can interpret. Standard modulation schemes in 5G and 6G include BPSK (binary phase-shift keying), QPSK (quad phase-shift keying), 16QAM (quadrature amplitude modulation with 16 modulation states), 64QAM, and 256QAM, although higher levels of QAM are possible. BPSK is rarely used. Most of the examples below relate to QPSK or 16QAM, with straightforward extension to the higher levels of modulation. QPSK is phase modulated at a constant amplitude, while the QAM schemes use both amplitude and phase modulation. For example, QPSK has four phase levels of modulation and only one amplitude level, whereas 16QAM has four phase and four amplitude levels. 64QAM has six amplitude and phase levels, while 256QAM has eight amplitude and phase levels. The number of amplitude levels in the modulation scheme may be termed "Namp", and the number of phase levels "Nphase" herein. The modulation scheme thus includes a number of "standard modulation states" of the modulation scheme, or simply "states" herein. The number of states, Nstates, is generally equal to the number of amplitude levels times the number of phase levels. Adjacent amplitude levels of the modulation scheme are separated by an "amplitude step", and adjacent phase levels are separated by a "phase step". Phases are relative to the unmodulated carrier. "Nref" is the number of reference elements in the demodulation reference. A "calibration set" is a set of Namp amplitude levels and Nphase phase levels, determined from the demodulation reference, which can be compared to each message element to demodulate the message.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers. Each subcarrier is at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message.

In addition to the 3GPP terms, the following terms are also used herein. Each modulated resource element of a message is referred to as a "message element" in examples below, to avoid confusion over the ambiguous term "symbol". Likewise, each resource element of a demodulation reference is a "reference element" herein. A "message amplitude value" is the amplitude modulation of a message element. A "reference amplitude value" is the amplitude modulation of a resource element of a demodulation reference. A "message phase value" is the phase modulation of a message resource element. A "reference phase value" is the phase modulation of a resource element of a demodulation reference. When the source of the element is unspecified or unambiguous, the terms may be shortened to "amplitude value" and "phase value". A "calibration set" is a set of Namp amplitude levels and Nphase phase levels specifying the modulation levels of the modulation scheme. Messages can be demodulated by comparing each message resource element to the calibration set, thereby determining the amplitude level and phase level corresponding to the amplitude value and phase value of each message element. A message may be configured "time-spanning" if it occupies multiple sequential symbol periods at a single frequency, or "frequency-spanning" if it occupies multiple subcarriers at a single symbol period (as opposed to "TDD" time-division duplexing and "FDD" frequency-division duplexing, which refer to duplexing). A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A message is "faulted" or "corrupted" if one or more bits of the message are altered relative to the original message. "Receiver" is to be interpreted broadly, as including connected processors and other electronics and related software/firmware configured to receive and process incoming wireless messages.

"Low-complexity" refers to devices and procedures necessary for wireless communication, exclusive of devices and procedures that provide high-performance communication. 5G/6G specifications include many procedures and requirements that greatly exceed those necessary for wireless communication, in order to provide high-performance communications at low latency and high reliability for users that demand it. Compared to scheduled and managed 5G/6G messaging, low-complexity procedures generally require less computation and less signal processing. For example, low-complexity procedures may be tailored to minimize the number of separate operations required of a device per unit of time. 5G and 6G specifications include a very wide range of options and contingencies and versions and formats and types and modes for many operations, to achieve maximum flexibility. A low-complexity specification may include defaults for each operation, and those defaults may be the simplest choices, or at least simpler than standard 5G and 6G procedures. "Simpler" procedures generally require fewer computation steps and/or smaller memory spaces than corresponding procedures in standard 5G/6G. Computation steps may be measured in floating-point calculations, for example.

"Reduced-capability" refers to wireless devices that cannot comply with 5G or 6G protocols, absent the systems and methods disclosed herein. For example, regular 5G and 6G user devices are required to receive a 5 MHz bandwidth in order to receive system information messages. Regular user devices are required to perform high-speed signal processing such as digitizing the received waveform, applying digital filtering or Fourier transforming an incoming waveform, phase-dependent integrating at several GHz frequency, and separating closely-spaced subcarriers. A reduced-capability device, on the other hand, may not need the high performance gained by such procedures, and may be incapable of performing them. A reduced-capability device may be able to receive a narrow-band wireless signal, demodulate the message, and interpret the content without further processing.

"High-density" wireless communication refers to cells where the number of active transmitters per unit area challenges the ability of the network to manage the traffic without degraded service. For example, in a built-up urban environment, a city block of 100×200 $m^2$ with 10-storey apartment buildings, 100 $m^2$ per apartment at double occupancy, and conservatively assuming 5 wireless devices per person (phones, watches, fitness bands, and whatnot) plus 10 wireless devices per apartment (computers, smart appliances, doorbell cameras, temperature sensors, dog collars, etc.), almost all of them being always-on devices, the active device density is then 40,000 devices per city block or about 2 devices per square meter. The road space between blocks scarcely reduces this load because it is typically filled with heavily-linked vehicles, traffic signals, wireless advertising signs, smart trash cans, and whatever future inventors can devise. Basic physics says with confidence that the electromagnetic background will be significant and fluctuating.

Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels, termed "RACH" herein, also called PRACH in references, represents both abstract and physical random access channels, including potentially multiple random access channels in a single cell, and configured for uplink and/or downlink, as detailed below. "CRC" (cyclic redundancy code) is an error-checking code. "RNTI" (radio network temporary identity) is a network-assigned user code.

5G and 6G references often use the same term for two different things. For example, "RACH" may refer to a random access message, the channel on which it is transmitted, or its assigned frequency or resource elements. "PBCH" may refer to a system information message or to the time-frequency resources on which it appears. "Collision" may refer to simultaneous interfering messages or to actual vehicle collisions. Disambiguation will be provided when necessary. Mathematical expressions may be sequentially ordered using parentheses, such as "A times (B plus C)" which means "add B to C, and then multiply that sum by A".

For economic reasons as well as commercial feasibility, future IoT application developers will demand ways to transmit messages using bandwidths and protocols appropriate to the simpler devices. It is important to provide such low-complexity options early in the 6G roll-out, while such flexibility can still be incorporated in the system design.

The systems and methods disclosed herein include "short-form demodulation references". These are low-complexity demodulation references suitable for reduced-capability user devices as well as high-performance devices. In some embodiments, the low-complexity demodulation references may be short messages, such as 1 or 2 or 3 or 4 resource elements in length, and thus may be termed "short-form" demodulation references, due to their reduced Nref size relative to the demodulation references of prior art. Examples focus on short-form demodulation references of one or two or four resource elements in length, termed one-point, two-point, and four-point short-form demodulation references respectively, although other sizes such as Nref=6 are possible. Each message element can be demodulated by determining the amplitude level and phase level at which that resource element has been modulated. Usually each amplitude level and phase level of the modulation scheme has been assigned a number, so the demodulated message may be represented by a sequence of such numbers, which a processor can then interpret to determine the message content.

In some embodiments, a short-form demodulation reference may explicitly show just a subset of the states of the modulation scheme, yet may provide sufficient information that a receiver can calculate the remaining modulation levels of the modulation scheme. Hence the processor can determine the remaining amplitude and phase levels of the modulation scheme, based on the subset of modulation levels explicitly exhibited in the reference resource elements, plus conventions as detailed below. In some embodiments, those calculations may involve only low-complexity calculations such as elementary logic and arithmetic. The calibration set can then be used for demodulating a message by comparing the amplitude and phase of each message element to each level in the calibration set. If a base station supports a low-complexity channel to accommodate the lowered communication needs of simpler wireless devices, the short-form demodulation references disclosed herein may be readily incorporated as the default demodulation reference for communications in that channel. In addition, high-performance messaging on the scheduled and managed channels of 5G/6G may beneficially employ short-form demodulation references for reduced latency, higher throughput, and improved interference rejection in noisy environments, due to the reduced size and complexity of the short-form demodulation references.

In some embodiments, the receiver may know the size and format of a short-form demodulation reference in advance of receiving it. For example, the receiver may already know the values of Namp, Nphase, Nref, and whether the exhibited amplitudes and phases represent the maximum or minimum levels, or other levels, of the modulation scheme. In other embodiments, the receiver may not know the format of the demodulation reference in advance, in which case the receiver may employ procedures disclosed herein to determine the format by analysis of the short-form demodulation reference, and to determine the remaining levels of the modulation scheme. In yet further embodiments, the receiver may know some of the listed format values in advance, and may determine other values by analysis of the short-form demodulation reference. In some embodiments, an amplitude ratio may be provided, equal to the minimum amplitude level of the modulation scheme divided by the maximum amplitude level. Additional information may be multiplexed into the provided amplitude ratio, such as indicating whether the short-form demodulation reference exhibits the minimum or maximum amplitude level, for example.

In some embodiments, the phase levels of the modulation scheme can be calculated from the phase levels exhibited in the short-form demodulation reference, by "extrapolation" or "interpolation". Extrapolation involves determining a phase step equal to the separation between adjacent phase levels of the modulation scheme, and then repeatedly adding the phase step to one of the exhibited phases, modulo 360, and thereby determining all of the phase levels of the modulation scheme as well as Nphase. All phase values are modulo 360, that is, restricted to the range zero to 360 degrees. Phases are relative to the unmodulated carrier. It is immaterial whether the phase step is positive or negative, or which of the exhibited phase values is used in the extrapolation, or in what order the various phase levels are found by the extrapolation, since the levels in the calibration set can be ordered according to phase value from low to high.

In some embodiments, interpolation may involve determining the maximum and minimum phase levels from the short-form demodulation reference, and then calculating the Nphase-2 remaining intermediate phase levels by interpolating between the maximum and minimum levels.

In some embodiments, the carrier phase of zero degrees is not used for modulation, and the minimum and maximum phase levels are configured to equally straddle the carrier phase, to avoid ambiguity and carrier noise. In that case, the minimum phase level of the modulation scheme is equal to one-half the phase step, and the maximum phase level is 360 degrees minus one-half the phase step. This arrangement provides that the maximum and the minimum phase levels both remain as far as possible from the carrier phase.

In some embodiments, one of the reference elements may be phase-modulated according to a first phase level, and another reference element may be phase-modulated according to the next higher phase level of the modulation scheme, so that the two levels are separated by one phase step of the modulation scheme. The remaining phase levels of the modulation scheme can be found by determining a phase step "estimate" by subtracting one of the exhibited phase values from the other, such as the smallest non-zero difference between two of the exhibited phases in the reference. The result is an estimate because the measured phase values generally include the effects of noise and interference. The receiver can then select the closest "standard" phase step value to the estimate. The standard phase step values are 180, 90, 60, and 45 degrees, corresponding to BPSK, 16QAM or QPSK, 64QAM, and 256QAM respectively. Then, the receiver can repeatedly add or subtract the selected standard phase step value to one of the phase values exhibited in the short-form demodulation reference, to calculate the remaining phase levels of the modulation scheme. Selecting the standard phase step also determines Nphase as the number of phases in the range of zero to 360 degrees. When prepared in this way, the resulting phase levels may include the phase distortions of noise and interference as exhibited in whichever reference phase value was used for the extrapolation. The resulting phase levels may then be used to demodulate the elements of a message that is subject to the same noise and interference as the reference elements. Since the message elements include the same noise and interference effects as the reference elements, the effects of noise and interference may be largely canceled in the demodulation, thereby enabling the receiver to correctly assign each message element's modulation to the correct state of the modulation scheme, and thereby resulting in fewer message faults, according to some embodiments.

In some embodiments, the short-form demodulation reference may include the minimum phase level only. If the receiver knows the phase of the unmodulated carrier, then the receiver can calculate the phase step estimate equal to twice that minimum phase value, and can then select the closest standard phase step value, and can then find the other phase levels by repeatedly adding the selected standard phase step to the minimum value. If the short-form demodulation reference includes the maximum phase level, the receiver can calculate the phase step estimate equal to twice the difference between that maximum value and 360 degrees, then select the closest standard value, and then extrapolate to find the other levels using the selected standard phase step value. When calculated in this way, each of the resulting phase levels may include the effects of noise and interference, as indicated by the exhibited phase value. Therefore the calculated phase levels, when used to demodulate a subsequent message that is subjected to the same noise and interference, can largely cancel those effects, resulting in fewer message faults despite noise and interference, according to some embodiments.

In some embodiments, the short-form demodulation reference may include two reference elements with phase modulations separated by two phase steps, or other known number of phase steps. In that case, the receiver can determine the phase step by subtracting one of those reference elements from the other.

In some embodiments, the receiver may know the modulation scheme in advance, including Nphase, in which case the receiver can calculate the phase step as 360 degrees divided by Nphase, and can calculate the various phase levels of the modulation scheme, including noise and interference effects, by adding the phase step repeatedly to one of the exhibited phase values, modulo 360.

In some embodiments, the maximum and minimum phase levels may be exhibited in the short-form demodulation reference. The receiver can calculate the phase step estimate according to the phase difference between those two levels, modulo 360, because phase is a circular parameter, and hence a single phase step separates the maximum and minimum values. As mentioned, the receiver can then select the standard phase step closest to that estimate, and calculate the remaining phase modulation levels of the modulation scheme by repeatedly adding or subtracting the selected phase step to any one of the exhibited phases in the short-form demodulation reference, modulo 360 degrees, and then ordering the levels by phase value. By these calculation examples, the phase step can be found as the phase difference between two of the reference elements, or alternatively twice the minimum phase (if the carrier phase is known). Then, the receiver can determine Nphase equal to 360 degrees divided by the phase step, or equivalently 180 degrees divided by the minimum phase. Then, the receiver can calculate each phase level as the minimum phase times an odd integer. Alternatively, and equivalently, the receiver can calculate each phase level equal to the minimum phase plus an integer times the phase step, among other mathematical relationships. In each case, the effects of noise and interference may be included in each of the calculated phase levels, and therefore the calculated phase levels can mitigate that same noise and interference when used to demodulate the message elements. It is immaterial which of the formulas listed above, or other equivalent formulas, are used by the receiver to determine the phase levels of the modulation scheme, so long as the reference elements provide enough information to calculate the phase levels of the modulation scheme. In some embodiments, the receiver knows, from convention or specifications or system information or prior messaging for example, the format of the short-form demodulation reference, including Nphase and Namp, how many reference elements are in the short-form demodulation reference, and (if necessary) whether the carrier phase is included or avoided in the modulation phase levels. In other embodiments, the receiver does not know the modulation scheme and/or the format of the short-form demodulation reference, and may determine the necessary parameters from information provided in the short-form demodulation reference.

To consider some specific examples, QPSK and 16QAM each have four phase levels, and the phase step is 90 degrees. The lowest phase level is normally 45 degrees (relative to the carrier, and assuming no interference). Thus the phase levels of the modulation scheme are 45, 135, 225, and 315 degrees, and Nphase=4 levels for those modulation schemes. With the same assumptions, the minimum phase for BPSK is 90 degrees, for 64QAM is 30 degrees, and for 256QAM is 22.5 degrees. The phase step is twice these values. If interference is present, the phases may be shifted, in the reference elements and the message elements, due to wave overlap. One purpose of the short-form demodulation reference is to enable the receiver to calibrate that distortion before demodulating the message, so that the phase values in the message elements can be assigned to the correct phase level of the modulation scheme, thereby compensating for current interference. In each case, a phase step estimate can be determined as the magnitude of the difference in phases of the exhibited levels, or as twice the minimum phase, or twice the difference between 360 and the maximum phase, or as 360/Nphase, depending on which values are provided in the short-form demodulation reference. A standard phase step value closest to that estimate can then be selected. In each case, the complete set of phase levels in the modulation scheme can be determined by repeatedly adding the selected standard phase step value to any one of the phase levels exhibited in the short-form demodulation reference, modulo 360 degrees.

In addition, the magnitude of the phase step can reveal the modulation scheme, if not already known to the receiver. For example, a phase step of 180 degrees implies BPSK with Nphase=2, a phase step of 90 degrees implies QPSK or 16QAM with Nphase=4, and a phase step of 60 degrees implies 64QAM with Nphase=6, and a phase step of 45 degrees implies 256QAM with Nphase=8. The method also applies to higher orders such as 1024QAM with Nphase=10 and a phase step of 36 degrees, and higher modulation in the same way.

In some embodiments, the transmitter may be configured to modulate the reference elements and message elements by phase values that include the carrier phase of zero degrees. Alternatively, the modulation may be based on another starting value, or an unknown starting value. For example, the phase values of QPSK may include zero, 90, 180, and 270 degrees. In that case, the receiver can calculate the phase step by subtracting one of the exhibited phase values of the reference elements minus another, or by dividing 360 by Nphase. The receiver can then determine the phase levels of the modulation scheme by repeatedly adding the phase step to one of the exhibited phases in the short-form demodulation reference, thereby determining the phase levels regardless of whether the carrier phase is used as a phase level by the transmitter.

In each of these cases, the phase values exhibited by the short-form demodulation reference include the effects of current interference and noise, and therefore provide a phase calibration for each phase level that compensates (or mitigates) the current noise and interference in the message, and thereby enables the receiver to assign each phase value in the message elements to the correct phase level of the modulation scheme despite noise and interference.

The amplitude modulation levels of the modulation scheme may also be determined from the amplitude levels exhibited in the short-form demodulation reference. For QAM modulation schemes, the number of amplitude levels Namp is equal to Nphase. For the PSK modulation schemes (BPSK and QPSK), Namp=1 since they are not amplitude modulated, and all message elements have the same amplitude. If the short-form demodulation reference includes multiple reference elements, all with the same amplitude modulation, then the receiver can conclude that Namp=1, and the modulation scheme is BPSK if the phase step is 180 degrees, or QPSK if the phase step is 90 degrees. For QAM-type modulation, the number of amplitude levels is equal to the number of phase levels, which can be determined from the phases exhibited in the demodulation reference (if not already known to the receiver). The receiver can then determine the complete set of amplitude levels, and the specific QAM type, by first calculating the amplitude step, equal to the smallest non-zero difference between any two of the amplitude values exhibited in the short-form demodulation reference. The receiver can then repeatedly add the amplitude step to the minimum amplitude level of the modulation scheme (if exhibited in the short-form demodulation reference) or repeatedly subtract the amplitude step from the maximum amplitude level of the modulation scheme (if exhibited in the short-form demodulation reference) until Namp amplitude levels have been determined, Namp equaling Nphase for QAM as mentioned. In other cases, the short-form demodulation reference may include reference elements exhibiting the minimum and maximum amplitude levels, in which case the receiver can determine the Namp-2 intermediate amplitude levels by interpolating between the exhibited maximum and minimum amplitude values. In each of these cases, the amplitude values exhibited by the short-form demodulation reference include the effects of current interference and noise, and therefore provide an amplitude calibration for each amplitude level that compensates (or mitigates) the current noise and interference in the message elements, and thereby enables the receiver to assign each amplitude value in the message elements to the correct amplitude level of the modulation scheme despite noise and interference.

In some embodiments, the short-form demodulation reference may include the minimum amplitude in one reference element, and the minimum amplitude plus the amplitude step in another reference element. In that case, the remaining amplitude levels can be found by extrapolation, that is, by determining the amplitude step by subtracting one reference element amplitude value from the other, and then repeatedly adding the amplitude step to either of those exhibited values until Namp amplitude levels are obtained.

In some embodiments, the short-form demodulation reference may exhibit the maximum amplitude level and the next-lower level, which is one amplitude step lower than the maximum. In that case, the amplitude step can be calculated by subtracting one of the reference amplitudes from the other, thereby obtaining the amplitude step, and then the remaining amplitude levels can be determined by repeatedly subtracting the amplitude step from either of the exhibited levels.

In some embodiments, the short-form demodulation reference may exhibit both the minimum and maximum amplitude levels, in which case the intermediate levels can be found by interpolation. In general, interpolation is more accurate than extrapolation and less sensitive to measurement uncertainties; hence, the version with maximum and minimum modulation levels explicitly provided may be preferred. In each case, the receiver is expected to know whether the minimum or maximum amplitude level is exhibited in the short-form demodulation reference, so that the receiver can add or subtract or interpolate as appropriate. Conventions may be established determining such a default format.

In some embodiments of the short-form demodulation reference, an "amplitude ratio" may be known to the receiver. The amplitude ratio may be equal to the minimum amplitude level divided by the maximum amplitude level of the modulation scheme (other versions discussed below). Thus the amplitude ratio is 1.0 for PSK modulation schemes such as BPSK or QPSK, since they have no amplitude modulation. For QAM modulations, the amplitude ratio is less than 1. All of the amplitude levels of the modulation scheme can then be determined from the amplitude values exhibited in the short-form demodulation reference. If the exhibited amplitude values of the short-form demodulation reference are all equal (within measurement error), then Namp=1. If the reference amplitude values are not all (substantially) equal, then the maximum and minimum amplitude levels of the modulation scheme can be calculated from the provided amplitude ratio, and then the remaining amplitude levels can be determined by interpolation between the maximum and minimum amplitude values so calculated. "Substantially equal" in this context implies equal to within less than one-half of an amplitude step.

For example, in case the short-form demodulation reference includes a single reference element only, and the amplitude ratio has been provided separately, and if the single reference element exhibits the minimum amplitude, then he receiver can calculate the maximum amplitude by dividing the minimum amplitude value by the amplitude ratio. On the other hand, if the exhibited amplitude is the maximum, then the minimum can be found by multiplying that value by the amplitude ratio. For the case of a one-point short-form demodulation reference, the receiving entity is expected to know (by convention or default or unicast message or system information broadcast, for example) the amplitude ratio, and whether the exhibited amplitude represents the minimum or maximum amplitude level. In either case, after calculating the opposite level by multiplying or dividing the exhibited amplitude by the amplitude ratio, the receiver can calculate all of the remaining amplitude levels by interpolation.

In another embodiment, the amplitude ratio equals the maximum amplitude level divided by the minimum amplitude level of the modulation scheme, and thus is greater than or equal to 1. In that case, the receiver can determine the minimum amplitude level by dividing an exhibited maximum amplitude level by the amplitude ratio, or can determine the maximum amplitude level by multiplying an exhibited minimum amplitude level by the amplitude ratio.

The receiver is expected to know whether the amplitude ratio is the minimum divided by the maximum, or the inverse.

In another embodiment, a short-form demodulation reference may have just one reference element, and the receiver may not know whether the exhibited amplitude is the maximum or minimum, and yet may still calculate all of the amplitude levels of the modulation scheme. To do so, a modified amplitude ratio may be provided, in which the modified amplitude ratio is configured to indicate whether the maximum or minimum is exhibited in the single reference element. For example, the amplitude ratio may be set to equal the maximum divided by the minimum amplitude (that is, greater than 1) when the exhibited amplitude is the minimum, and the modified amplitude ratio may be set equal to the minimum divided by the maximum (that is, less than 1) when the exhibited amplitude is the maximum. The receiver then does not need to know whether the maximum or minimum amplitude level is shown. Instead, the receiver can multiply the exhibited amplitude value by the modified amplitude ratio in either case, and thereby obtain a second amplitude value. The receiver can then calculate the intermediate amplitude values by interpolation between those two values. Although the receiver does not know whether the exhibited amplitude is the maximum or minimum, nevertheless the receiver can calculate the intermediate levels by interpolating between the exhibited amplitude and the second amplitude. In other words, the modified amplitude ratio is configured to automatically accommodate either possibility.

Regardless of the order in which the amplitude levels are calculated, the resulting amplitude levels may be re-ordered from minimum to maximum in the calibration set, and numbered accordingly.

The foregoing descriptions are based on classical amplitude modulation multiplexed with classical phase modulation. However, in some embodiments, the demodulation reference and the message elements may be modulated by pulse-amplitude modulation (PAM), in which two amplitude-modulated signals are added with a 90-degree phase offset between them. Upon receipt, the demodulator then picks out the "real" (zero offset) and "imaginary" (90-degree offset) signals for each of the reference elements and message elements. The two phase modulations are also sometimes called the "I" or in-phase component and the "Q" or quadrature component. The receiver then prepares a "constellation" of modulation states from the measured real and imaginary values of the reference elements, each state having a particular real amplitude and a particular imaginary amplitude. Negative amplitude values correspond to a 180-degree phase shift. The receiver then demodulates the message elements by comparing their real and imaginary values to the real and imaginary levels of the constellation, and thereby determines the modulation state of each message element, as desired. For example, 16QAM with PAM modulation has four real amplitudes and four imaginary amplitudes, which are combined in each message element to yield 16 states overall. The constellation of PAM is equivalent to the calibration set of regular amplitude-phase modulation. The extrapolation and interpolation methods described above are straightforwardly applicable to the real-imaginary modulation states of PAM. Many other modulation technologies and schemes exist. As long as the modulation scheme involves modulating the phase and (optionally) the amplitude of an electromagnetic wave, it is immaterial which modulation technology is employed. The principles disclosed herein may apply to each of these modulation technologies, as will be apparent to artisans with ordinary skill in the art after reading the present disclosure.

Numerous formats of the short-form demodulation reference are envisioned and disclosed. The short-form demodulation reference may include a single reference element, two reference elements, four reference elements, or three or six or any number of reference elements. The short-form demodulation reference may exhibit the maximum or minimum phase level, and/or the maximum or minimum amplitude level, of the modulation scheme. The short-form demodulation reference may include two reference elements that differ in phase by one phase step and/or that differ in amplitude by one amplitude step, or other known number of amplitude or phase steps. Separate information may be provided such as an amplitude ratio and/or an indication that the short-form demodulation reference includes a minimum or maximum amplitude and/or Namp and/or Nphase and/or the modulation type. Such information may be provided by a previous message, or by convention, or by a default for low-complexity protocols, or otherwise. The receiver is expected to have sufficient information to be able to calculate any remaining levels from the exhibited modulation states, and thereby to complete the calibration set. Such calculations may include basic arithmetic and logic, consistent with the low-complexity methods presented herein. Due to the many possible versions listed and envisioned, differing in format but otherwise equivalent, it would be helpful for a wireless standards committee to declare one of the short-form demodulation versions to be a default standard.

Turning now to the figures, in a first example, the systems and methods include a four-point short-form demodulation reference with a length of four reference elements.

FIG. 1A is a phase chart showing an exemplary embodiment of a short low-complexity demodulation reference such as a 4-point short-form demodulation reference, according to some embodiments. A phase chart is a schematic representation of the states of a modulation scheme, in a polar coordinate system representing phase azimuthally and amplitude radially. As depicted in this non-limiting example, the large circles 100 represent the amplitude levels of the modulation scheme, and some of the states of the modulation scheme are shown as points such as 101 and 102. The amplitude of a state 101 is shown as the radius 104. The phase of a state 101 is shown as the angle 103 relative to the horizontal axis (going counter-clockwise). The horizontal axis represents zero degrees, or unmodulated carrier. The number of amplitude levels Namp is the number of the large circles 100, and the number of phase levels Nphase equals the number of angles 103 of the states. For clarity, not all of the states of the modulation scheme are shown. The modulation scheme is 16QAM in this case, with Namp=4 and Nphase=4.

The states of the depicted four-point demodulation reference are configured to explicitly exhibit four amplitude levels 100 and four phase levels 103. If the modulation scheme is 16QAM or QPSK, those four states thereby specify all of the amplitude and phase levels of the modulation scheme, and no interpolation or extrapolation is needed. If the modulation scheme is higher, such as 256QAM, then the remaining amplitude and phase levels of the modulation scheme may be calculated from the exhibited ones by interpolation or extrapolation as described above.

As depicted in this non-limiting example of a four-point short-form demodulation reference, the first state 101 is phase-modulated at the minimum phase level, and the second state 102 is phase-modulated at the minimum phase plus a phase step. The phase step estimate can therefore be calculated by subtracting the first phase value 101 from the second phase value 102 or vice versa (the sign of the phase step being immaterial, since phase is a circular parameter). Alternatively, the phase step estimate can be calculated by doubling the minimum phase value as exhibited in point 101, assuming that the minimum phase and the maximum phase are equally spaced from zero degrees. In this example, the minimum phase point 101 and the maximum phase point 102 are both spaced apart from the carrier by the same amount, which is ±45 degrees for 16QAM. Thus the minimum phase is 45 degrees and the phase step is 90 degrees for 16QAM, as shown. The number of phase states is 360 degrees divided by the phase step, or equivalently 180 degrees divided by the minimum phase. By either method, Nphase equals 4 in the depicted case. The measured phase levels may differ from the ideal values due to noise and interference. However, based on the estimated phase step from the measured phase values, the receiver can then select the closest "standard" phase step corresponding to a standard modulation scheme such as 16QAM. In the depicted example, the phase difference between adjacent phase levels is 90 degrees, and therefore the modulation scheme is either 16QAM or QPSK. Four amplitude levels are indicated, so it cannot be QPSK, and therefore the scheme must be 16QAM.

The short-form demodulation reference can also enable the receiver to determine all of the amplitude levels of the modulation scheme. In the depicted modulation scheme, an integer number Namp of amplitude levels (specifically four amplitude levels) are indicated by the four large circles 100 of varying radius. If the modulation scheme is 16QAM, as in the present case, then the four amplitude values exhibited in the short-form demodulation reference include all of the amplitude levels of the modulation scheme. If a higher order of modulation is involved, and the short-form demodulation reference exhibits the maximum and minimum amplitude levels of the modulation scheme, then the receiver can calculate the Namp-2 intervening amplitude levels by interpolation between the minimum and maximum amplitude levels. The receiver knows Namp at that time either by convention or by the phase levels as described above.

In the figure, the four depicted states are the reference elements of a short-form demodulation reference that exhibits four amplitude levels including a maximum amplitude (for point 101) and a minimum amplitude (point 102), plus two intermediate points not labeled. The points also exhibit the maximum, minimum, and two intermediate phases. In this case, the four-point short-form demodulation reference exhibits all four amplitude levels and all four phase levels in 16QAM, and therefore no interpolation or extrapolation or other calculation is needed to fill in the levels of the calibration set. All of the amplitude levels and phase levels of the modulation scheme are explicitly exhibited by the short-form demodulation reference as shown, and those levels correspond to the complete calibration set for 16QAM. The levels explicitly exhibited in the depicted short-form demodulation reference are therefore sufficient to enable a receiver to determine the complete calibration set, without the need for interpolation or extrapolation, in this case.

Higher levels of modulation, such as 256QAM, can also be demodulated according to a four-point short-form demodulation reference, by calculating the intermediate amplitude and phase levels by interpolation or extrapolation as described above.

A method for demodulating message elements may include calculating a calibration set that includes the amplitude and phase modulation levels of a modulation scheme, based at least in part on the exhibited amplitude and phase values of reference elements in a short-form demodulation reference, wherein elementary calculations are sufficient to determine amplitude and phase levels not explicitly represented in the reference elements. To demodulate a message, the receiver can compare the amplitude and phase modulation values of each message element to the levels in the calibration set, and select the closest-matching levels.

A method for demodulating a message modulated with a modulation scheme of higher order, such as 256QAM with 8 phase levels and 8 amplitude levels, using a four-point short-form demodulation reference, may include determining amplitude and phase levels of the modulation scheme from the phase and amplitude levels exhibited by the short-form demodulation reference, which is a subset of the amplitude and phase levels of the modulation scheme. For example, if the minimum and maximum amplitude levels are exhibited in the short-form demodulation reference, the remaining amplitude levels can be found by interpolating between the minimum and maximum amplitude values, thus totaling Namp levels. Alternatively, the amplitude levels may be found by calculating the amplitude step from the exhibited amplitude levels, and then repeatedly adding the amplitude step to one of the amplitudes provided. Likewise, the remaining phase levels may be found by interpolating between the maximum and minimum phase values if provided, or by repeatedly adding the phase step to one of the phase values exhibited in the short-form demodulation reference.

Figure 1B:
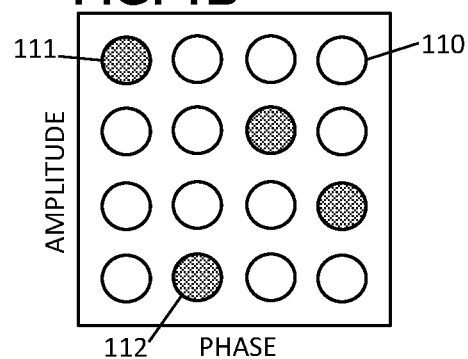
FIG. 1B is a schematic sketch showing an exemplary embodiment of a modulation table for a 4-point short-form demodulation reference, according to some embodiments.

FIG. 1B is a modulation table showing an exemplary embodiment of a short low-complexity demodulation reference such as a four-point short-form demodulation reference such as that of FIG. 1A, according to some embodiments. A modulation table is a graphic showing the modulation states of a modulation scheme, with phase shown horizontally and amplitude shown vertically. As depicted in this non-limiting example, the modulation table shows the sixteen states of 16QAM as circles 110, and the four stippled states correspond to the four states indicated in FIG. 1A. The state 111 exhibits the maximum amplitude and the lowest phase, corresponding to 101 in the previous figure, and state 112 exhibits the minimum amplitude with the second phase level, corresponding to 102. These are followed by two more states with intermediate amplitude and phase values. Thus FIGS. 1A and 1B contain the same information in different forms.

Figure 1C:
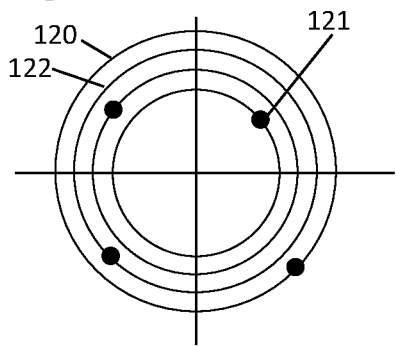
FIG. 1C is a schematic sketch showing another exemplary embodiment of a phase chart for a 4-point short-form demodulation reference specifying four amplitude and four phase levels, according to some embodiments.

FIG. 1C is a phase chart showing another exemplary embodiment of a short low-complexity demodulation reference such as a 4-point short-form demodulation reference, according to some embodiments. As depicted in this non-limiting example, the four points span the four amplitude levels and four phase levels of 16QAM in a particular order. Amplitude levels are shown as large circles 120. Unlike the previous example, the points are sequenced through the amplitude and phase levels in a monotonic fashion. The first point 121 exhibits the minimum amplitude level and the minimum phase level. The second point 122 has the next-larger amplitude level and the next-larger phase level, and the remaining points continue the same pattern. In this case, the modulation scheme is 16QAM with four amplitude and four phase levels. The four-point short-form demodulation reference can explicitly exhibit all of the amplitude and phase levels of the modulation scheme, thereby providing a complete calibration set explicitly, as mentioned. A message may be demodulated by comparing the various amplitude and phase levels of the short-form demodulation reference to the amplitude and phase values of the message elements.

Figure 1D:
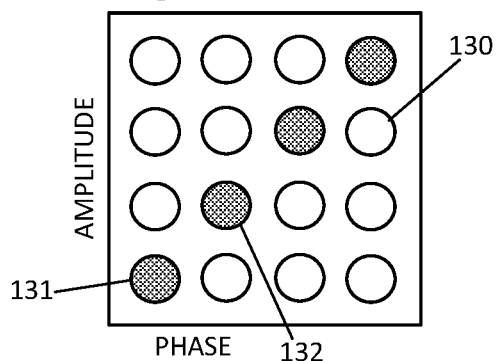
FIG. 1D is a schematic sketch showing another exemplary embodiment of a modulation table for a 4-point short-form demodulation reference specifying four amplitude and four phase levels, according to some embodiments.

FIG. 1D is a modulation table showing an exemplary embodiment of a low-complexity demodulation reference such as a four-point short-form demodulation reference such as that of FIG. 1C, according to some embodiments. As depicted in this non-limiting example, the modulation states (of 16QAM in this case) are shown as circles 130 in amplitude and phase, and four stippled states (131 and 132 labeled) represent the four reference elements of the short-form demodulation reference, corresponding to the points of FIG. 1C. As shown, the short-form demodulation reference elements exhibit the minimum amplitude with the minimum phase, then the next-higher amplitude and phase levels, followed by the remaining states in ascending order.

Figure 1E:
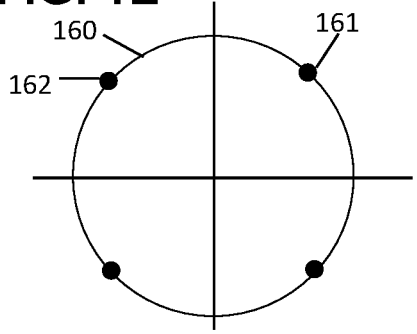
FIG. 1E is a schematic sketch showing an exemplary embodiment of a phase chart for a 4-point short-form demodulation reference for QPSK, according to some embodiments.

FIG. 1E is a phase chart showing an exemplary embodiment of a short low-complexity demodulation reference such as a 4-point short-form demodulation reference for QPSK, according to some embodiments. As depicted in this non-limiting example, the four points lie on a single amplitude circle 160, since QPSK has a single amplitude (in other words, QPSK is not amplitude-modulated). The first point 161 has minimum phase, the next point 162 has the next-higher phase, and so forth for four points. An advantage of using a four-point short-form demodulation reference for the four-point QPSK scheme may be that all of the modulation states can be explicitly provided in the short-form demodulation reference, so that the message elements can be demodulated by directly comparing with the reference elements of the short-form demodulation reference without interpolation, which may be easier for reduced-capability devices.

Figure 1F:
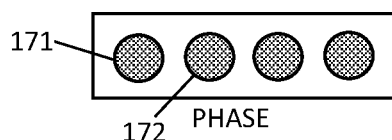
FIG. 1F is a schematic sketch showing an exemplary embodiment of a modulation table for a 4-point short-form demodulation reference for QPSK, according to some embodiments.

FIG. 1F is a modulation table showing an exemplary embodiment of a low-complexity demodulation reference such as a four-point short-form demodulation reference such as that of FIG. 1E, according to some embodiments. As depicted in this non-limiting example, the four states of QPSK are all stippled, indicating that they all appear in the short-form demodulation reference elements. The first state 171 corresponds to 161 and the second state 172 corresponds to 162.

An advantage of providing a four-point short-form demodulation reference such as that of FIG. 1A or 1B or 1C or 1D or 1E or 1F may be that the phase and amplitude values provided in the short-form demodulation reference may be used to demodulate the message elements. Another advantage may be that the provided amplitude values can explicitly exhibit all of the modulation scheme amplitude and phase levels directly (as in 16QAM), or can be interpolated to calculate all of the amplitude and phase levels (as in 256QAM). Another advantage may be that the phase levels of a modulation scheme may be calculated by determining a phase step estimate from the reference elements, selecting the closest standard value, and repeatedly adding the selected phase step to one of the exhibited phases, modulo 360, thereby determining all of the phase levels of the modulation scheme. Another advantage may be that the amplitude levels of the modulation scheme may be determined by interpolating between maximum and minimum amplitudes provided in the short-form demodulation reference, or by calculating an amplitude step and repeatedly adding or subtracting the amplitude step to the exhibited amplitudes. Another advantage may be that the four-point short-form demodulation reference is short, only four reference elements, and thus may be appended or prepended to other messages, or interspersed within longer messages, to provide frequent updates of the specific modulation levels used in an accompanying message, including effects of local interference, if any. Alternatively, the short-form demodulation reference may be supplied separately from a message, such as periodically, such as in the first four subcarriers of the first uplink or downlink symbol period of each slot, or the first four symbol periods of a single subcarrier in each slot, for example. Another advantage may be that the four-point short-form demodulation reference may include the maximum and minimum amplitudes, in which case there may be no need to extrapolate amplitude values beyond those explicitly exhibited in the short-form demodulation reference. Another advantage may be that the phase levels provided in the reference may include the minimum phase level and the next-higher phase level, or the maximum phase and the maximum phase minus the phase step, or separated by twice the phase step, or other like combinations. In each case, all of the amplitude and phase levels of the modulated message may be identified by interpolation and extrapolation, and the message may thereby be demodulated, so long as the receiving entity knows which type of short-form demodulation reference is employed. Another advantage may be that distortions, in amplitude or phase or both, due to noise or interference, may be included in the amplitude and phase values of the reference elements, and therefore those distortions may be canceled when the received reference values are used to demodulate a subsequent message.

Another advantage may be that the procedures of FIG. 1A or 1B or 1C or 1D or 1E or 1F may be implemented as a software (or firmware) update, without requiring new hardware development, and therefore may be implemented at low cost, according to some embodiments. The procedures of FIG. 1A or 1B or 1C or 1D or 1E or 1F may be implemented as a system or apparatus, a method, or instructions in non-transient computer-readable media for causing a computing environment, such as a user device, a base station, or other signally coupled component of a wireless network, to implement the procedure. Another advantage may be that the depicted low-complexity procedures may be compatible with devices that may have difficulty complying with prior-art registration procedures. Other advantages may be apparent to one of ordinary skill in the art, given this teaching. The advantages listed in this paragraph are also true for other lists of advantages presented for other embodiments described below.

Figure 2A:
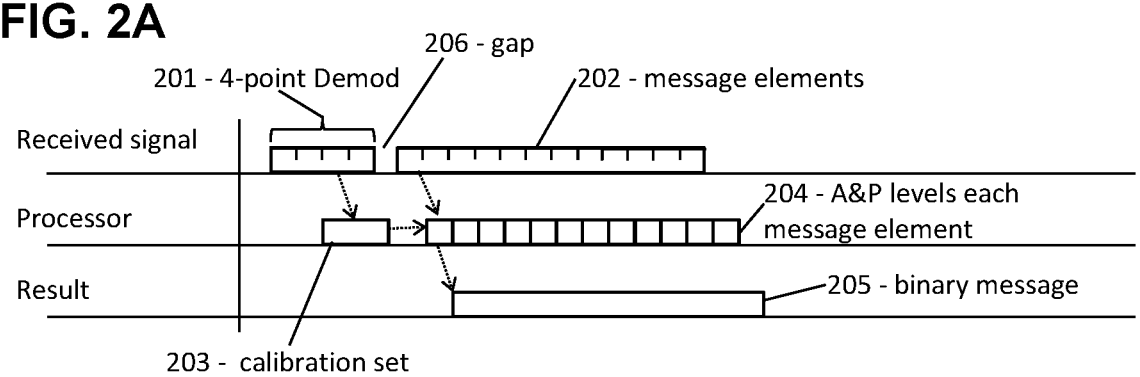
FIG. 2A is a sequence chart showing an exemplary embodiment of a process for demodulating a message using a four-point short-form demodulation reference, according to some embodiments.

FIG. 2A is a sequence chart showing an exemplary embodiment of a low-complexity procedure for demodulating a message using a short-form demodulation reference, according to some embodiments. Actions and events of a receiver are shown on the first line, then actions or events of a processor connected to the receiver on the second line, and a result or processor output is shown on the last line. Although messages are usually shown time-spanning in sequence charts for clarity, in many cases the messages may be transmitted as frequency-spanning. Arrows show timing or information flow. In this case, the receiver does not know the specific format of the short-form demodulation reference ("Demod"), and therefore must determine Namp and Nphase from the values exhibited in the short-form demodulation reference. As depicted in this non-limiting example, the demodulation reference is a four-point short-form demodulation reference 201, followed by an optional gap 206, and a message 202 which is to be demodulated, with little marks demarking each of the message elements. The gap 206 may be one symbol period or more, and may include zero transmission, or transmission with an amplitude below the lowest amplitude level of the modulation scheme, or unmodulated carrier (at the subcarrier frequency), or other characteristic signal not resembling the data. The position of the gap 206 may thereby indicate the length of the demodulation reference 201, and may also indicate the starting point of the message 202, which may be helpful to the receiver if the format of the short-form demodulation reference 201 is not already known. The gap 206 thereby indicates that the short-form demodulation reference 201 is provided in the resource elements preceding the gap 206, and the message to be demodulated 202 is provided after the gap 206. The processor may analyze the reference elements of the four-point short-form demodulation reference and may thereby determine an amplitude and phase calibration set 203, based on the amplitude and phase values of the demodulation reference 201, and also using amplitude interpolation or extrapolation, and phase interpolation or extrapolation, as needed to calculate any remaining levels that are not explicitly provided in the short-form demodulation reference 201.

Then, the processor may analyze each resource element of the message 202, by comparing the amplitude of each message element 202 to the calibration set 203, and comparing the phase of each message element 202 to the calibration set 203, and may thereby assign amplitude and phase modulation levels 204 to each of the message elements.

The modulation levels may be represented numerically. For example, each amplitude and phase level in the calibration set 203 may be assigned a binary code. In 16QAM with four amplitude levels and four phase levels, the code may be a two-bit binary code, such as 00 for the lowest amplitude level, 01 and 10 for intermediate levels, and 11 for the highest level. Likewise the four phase modulation levels can be represented by 00 for the lowest and 11 for the highest phase. The modulation state of each message element 202 may then be represented by a 4-bit code indicating the specific amplitude level and phase level 204. The 4-bit code may show the amplitude code followed by the phase code, for each message element. For example, a message element modulated with the lowest amplitude level and the highest phase level would be 0011. The message 202 can then be represented by a series 205 of binary bits containing the message information.

The bit-level representation generally depends on the modulation scheme. BPSK represents one bit per message element, QPSK has 2 bits per message element, 16QAM has 4 bits per message element, 64QAM requires 6 bits per message element, and 256QAM would need 8 bits per message element.

Figure 2B:
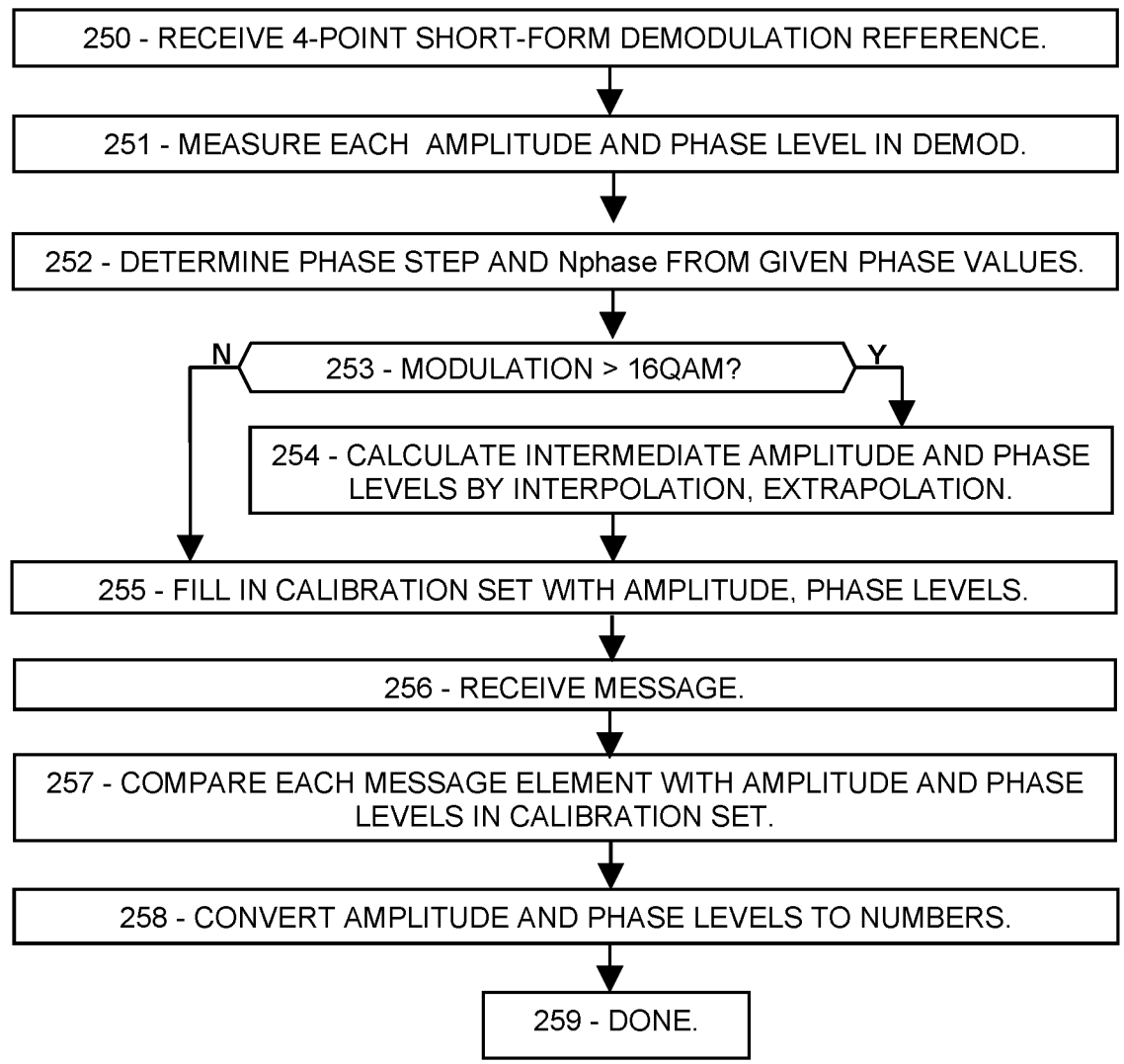
FIG. 2B is a flowchart showing an exemplary embodiment of a process for demodulating a message using a four-point short-form demodulation reference, according to some embodiments.

FIG. 2B is a flowchart showing an exemplary embodiment of a low-complexity procedure for using a short-form demodulation reference, according to some embodiments. As depicted in this non-limiting example, a receiver does not know initially the format of the short-form demodulation reference. Therefore, the receiver first determines the phase step from the phase values in the short-form demodulation reference and determines Nphase. The receiver can then refer to the amplitudes in the short-form demodulation reference and determine that the amplitude levels are not all equal to each other, which indicates that the modulation scheme is a QAM type. The receiver therefore sets Namp equal to Nphase, and thereby determines the modulation scheme specifically. The receiver then performs calculations if necessary to determine any remaining phase and amplitude levels, stores them in a calibration set in a processor memory, and then compares the message elements to the modulation levels so determined.

At 250, a receiving entity receives a four-point short-form demodulation reference and, at 251, measures the amplitude values and phase values of each of its four reference elements. At 252, the receiver determines the phase step estimate by subtracting one of the exhibited phase levels from another, then selects the closest standard phase step value, and determines Nphase by dividing 360 by the selected phase step value. Alternatively, and more simply in this case, the receiver may accept the phase levels exhibited in the demodulation reference as the phase levels of the modulation scheme, interpolating if necessary to fill in any intervening levels. The receiver also compares the various amplitude values in the short-form demodulation reference and determines whether Namp=1 or Namp=Nphase. At 253, the receiver determines whether the modulation is higher than 16QAM, according to Nphase as determined. If the modulation is higher than 16QAM, such as 64QAM or 256QAM, then at 254 the receiver calculates the remaining amplitude and phase levels from those explicitly exhibited in the short-form demodulation reference elements, by interpolating between the maximum and minimum amplitude values or by extrapolating with the amplitude step, and by interpolating or extrapolating the phase values, as described above. At 255, the amplitude and phase modulation values from the short-form demodulation reference elements and, if applicable, from the calculations, are accumulated as a calibration set which includes all of the amplitude and phase levels of the modulation scheme.

At 256 (if not sooner), the message to be demodulated is received. At 257, each message element is compared to the amplitude and phase modulation levels in the calibration set. The amplitude value of each message element is thereby assigned a specific amplitude modulation level, and the phase value of each message element is assigned a specific phase modulation level, by comparing to the calibrated levels. At 258, a binary representation of the message is prepared by concatenating the numbers associated with each amplitude and phase level of each message element, and is done at 259.

An advantage of providing a four-point short-form demodulation reference may be that it is short, just four reference elements. Another advantage may be that four modulation states in phase and amplitude can be explicitly provided, thereby enabling direct demodulation of QPSK or 16QAM without interpolation or extrapolation, in some embodiments. Another advantage may be that higher modulation schemes such as 64QAM or 256QAM may be demodulated, using interpolation or extrapolation to derive the remaining levels from the explicitly provided levels. Another advantage may be that distortions, in amplitude or phase or both, due to noise or interference, may be included in the amplitude and phase values of the reference elements, and therefore those distortions may be canceled when the received reference values are used to demodulate a subsequent message.

Figure 2C:
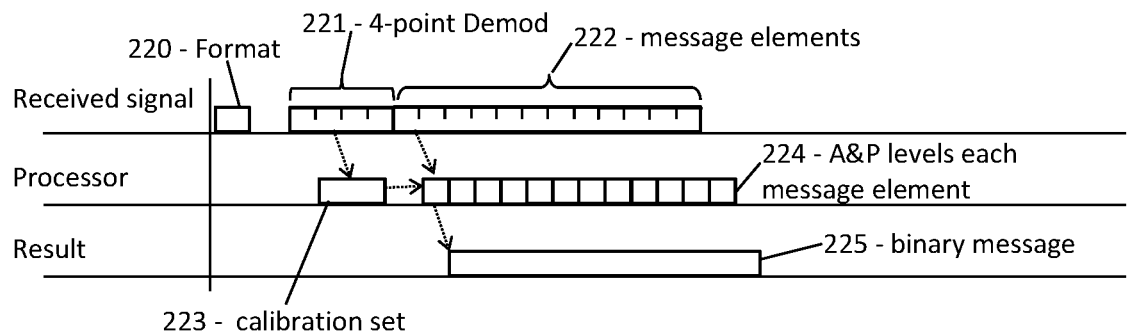
FIG. 2C is a sequence chart showing another exemplary embodiment of a process for demodulating a message using a four-point short-form demodulation reference, according to some embodiments.

FIG. 2C is a sequence chart showing another exemplary embodiment of a process for demodulating a message using a four-point short-form demodulation reference, according to some embodiments. As depicted in this non-limiting example, a receiver initially obtains information 220 about the format of a 4-point short-form demodulation reference ("Demod") 221, and therefore can proceed to fill in the calibration set 223 more directly than in the previous example, using the known format (including Namp, Nphase, whether the maximum or minimum amplitude and phase values are exhibited, and like information). The receiver also receives the message 222 and, comparing each message element's phase and amplitude values to the corresponding values in the calibration set 223, determines the amplitude and phase levels 223 of the modulation scheme for each message element. The receiver then converts the amplitude and phase levels (A&P) 224 to the corresponding binary code 225, and passes the demodulated message to a processor for interpretation.

Figure 2D:
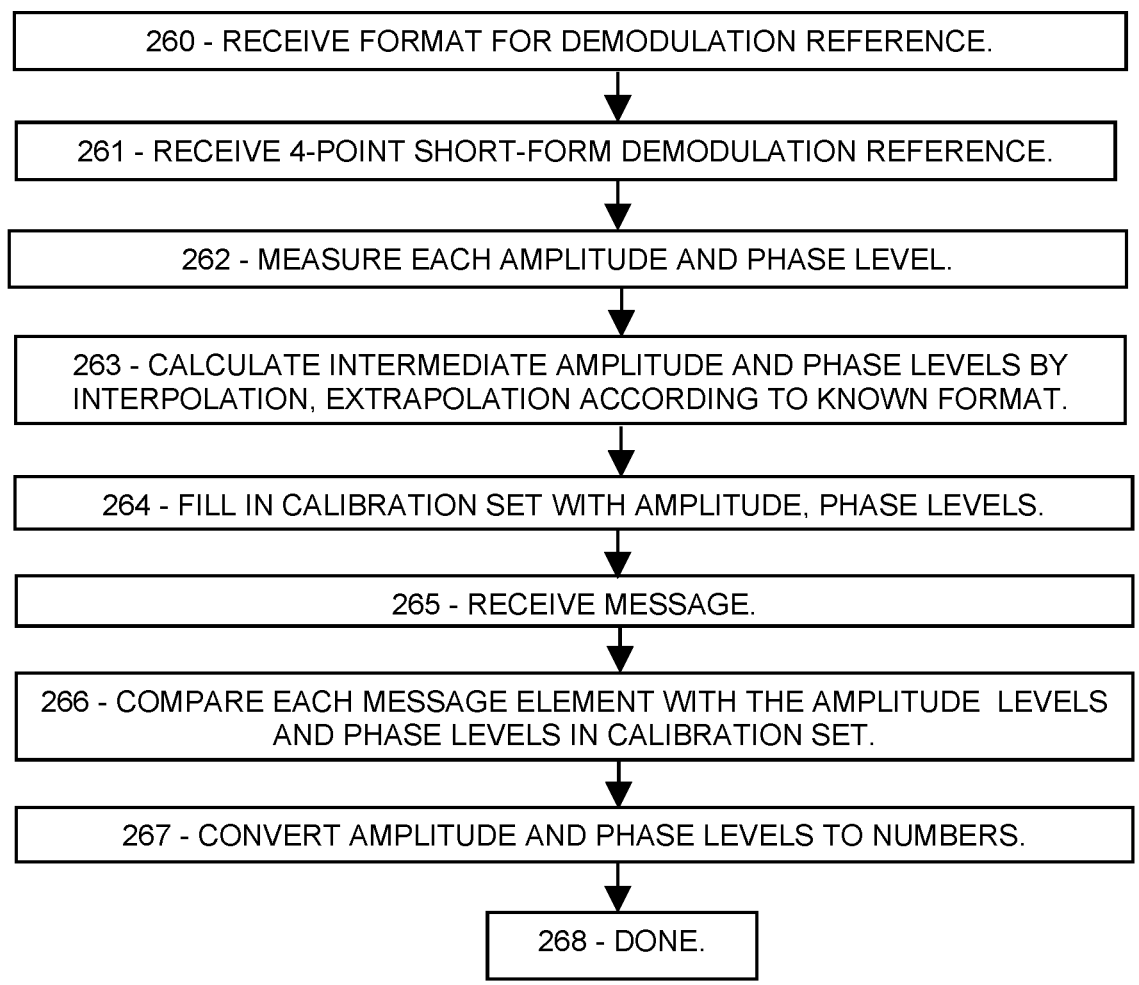
FIG. 2D is a flowchart showing another exemplary embodiment of a process for demodulating a message using a four-point short-form demodulation reference, according to some embodiments.

FIG. 2D is a flowchart showing another exemplary embodiment of a process for demodulating a message using a four-point short-form demodulation reference, according to some embodiments. As depicted in this non-limiting example, a receiver initially obtains information about the format of a subsequent four-point short-form demodulation reference at 260. At 261, the receiver receives the four-point short-form demodulation reference, and at 262 measures the amplitude and phase values of each reference element. At 263, the receiver uses the known format of the short-form demodulation reference to calculate the remaining amplitude and phase levels of the modulation scheme not exhibited in the reference elements, and thereby fills in the calibration set with all of the amplitude and phase levels of the modulation scheme at 264. At 265 (if not sooner) the receiver receives the message and, at 266, compares each message element's amplitude and phase values to those of the calibration set, thereby determining which level is a closest match to each message element. At 267, the receiver converts those amplitude and phase levels for each message element to numbers that a processor can interpret, and is done at 268.

The systems and methods further include a two-point short-form demodulation reference with a length of two reference elements, as in the following examples.

Figure 3A:
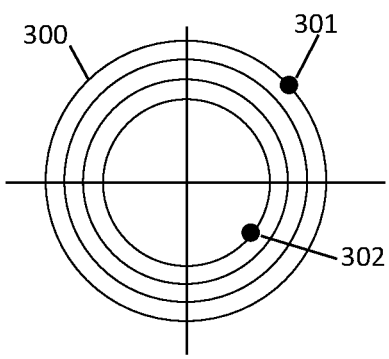
FIG. 3A is a schematic sketch showing an exemplary embodiment of a phase chart for a 2-point short-form demodulation reference, according to some embodiments.

FIG. 3A is a phase chart showing an exemplary embodiment of a short low-complexity demodulation reference such as a two-point short-form demodulation reference, according to some embodiments. As depicted in this non-limiting example, the short-form demodulation reference includes two points representing two reference elements with particular modulations. The amplitude levels are indicated as circles 300. The demodulation reference includes a first reference element 301 modulated with a maximum amplitude and a minimum phase (45 degrees in this case), and a second reference element 302 with the minimum amplitude value and maximum phase. The phase step estimate can be calculated as the phase difference between the two points 301-302, or by doubling the minimum phase as exhibited by point 301, or by doubling the difference between 360 degrees and the phase of the other point 302, among many other ways to determine the phase step estimate. In each case, the receiver selects a standard phase step value that is closest to the phase step estimate derived from the measured values of the reference elements. For the case shown, the selected standard phase step value is 90 degrees and the modulation scheme is 16QAM. The short-form demodulation reference thereby exhibits the maximum and minimum amplitude levels and the maximum and minimum phase levels of the modulation scheme. The number of phase levels can be determined from the phase step (specifically, 360 degrees divided by the phase step), and the intermediate phase levels can be calculated by interpolation between the minimum and maximum phases. The number of amplitude levels is 1 if the minimum and maximum amplitudes are the same, or substantially the same (such as, within expected measurement uncertainties), and Namp is equal to the number of phase levels otherwise. In the depicted case, the amplitude levels of the two points 301-302 are not equal, and therefore the modulation scheme cannot be PSK, and therefore is QAM at some order. The order is 16QAM here since, for QAM schemes, the number of amplitude levels is equal to the number of phase levels, or Namp=Nphase, and for 16QAM the phase step is 90 degrees. The various amplitude levels of the modulation scheme may be calculated by interpolation between the minimum and maximum amplitudes explicitly exhibited in the short-form demodulation reference. The set of amplitude and phase levels thus determined constitutes the calibration set, and the message elements, which were modulated according to the same modulation scheme, can be demodulated by comparison with the amplitude levels of the calibration set.

Figure 3B:
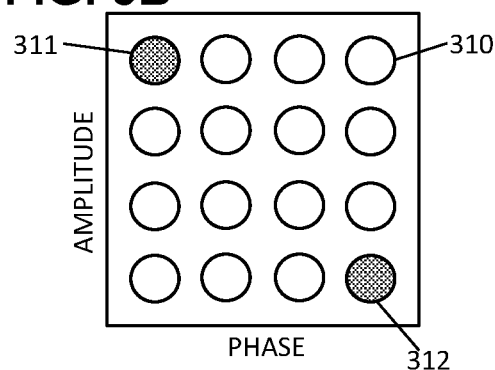
FIG. 3B is a schematic sketch showing an exemplary embodiment of a modulation table for a 2-point short-form demodulation reference, according to some embodiments.

FIG. 3B is a modulation table showing an exemplary embodiment of a short low-complexity demodulation reference such as a 2-point short-form demodulation reference, according to some embodiments. As depicted in this non-limiting example, the table shows valid modulation states 310 of, in this case, 16QAM, with phase horizontally and amplitude vertically. Two states 311 and 312 are stippled, corresponding to the states 301, 302 of FIG. 3A. The state 311 represents the first reference element of the two-point short-form demodulation reference, with the maximum amplitude and the minimum phase, while the second stippled point 312 has the minimum amplitude and the maximum phase. The phase difference between the two points 311-312 (or 360 minus the difference, depending on the order of the points) thereby indicates the phase step estimate, and the remaining phase levels can be found by selecting the closest standard phase step and repeatedly extrapolating from either of the points 311-312 by the selected phase step, modulo 360, or by interpolating between the maximum and minimum phase values exhibited. The remaining amplitude levels can be found by linearly interpolating between the amplitude values of the two reference elements 311-312. Hence the complete calibration set of amplitude and phase levels of the modulation scheme can be found from the two-point short-form demodulation reference, if the receiving entity knows the type and format of the short-form demodulation reference. The message elements may then be demodulated by comparing each message element to the calibration set. The two-point short-form demodulation reference provides sufficient information to generate the complete calibration set, if the reference elements include the maximum and minimum amplitude levels, or if they differ by one amplitude step or a known number of amplitude steps, and if the reference phases include the maximum and minimum phases, or they differ by one phase step or a known number of phase steps. In each case, the remaining amplitude and phase levels can be calculated by interpolation and/or extrapolation, as described.

For simplicity and standardization, a default demodulation reference format may advantageously be selected, for example by a wireless standards committee. The default short-form demodulation reference may then be used in a wide range of applications and users. The short-form demodulation reference of FIGS. 3A and 3B would be an advantageous choice because all of the remaining amplitude and phase levels can be readily calculated using only interpolation between the points provided, and the same methods apply to all PSK and QAM modulation schemes, according to some embodiments. As mentioned, interpolation is generally less error-prone than extrapolation for determining any additional modulation levels not exhibited in the short-form demodulation reference. The versions of FIGS. 3A and 3B are also advantageous because they exhibited values that span the full range of amplitudes, and therefore can mitigate both additive distortions and multiplicative distortions, as discussed below.

If the version of FIG. 3A or 3B is adopted as the default standard, no additional information about the modulation scheme needs to be communicated. For example, it is unnecessary to indicate which reference element represents the minimum or maximum values, since the receiver can interpolate between them in either case. In addition, with this version, the modulation order can be readily determined according to the phase difference between the two phase values of the reference elements, that is, 180, 90, 60, or 45 degree phase difference according to BPSK, QPSK or 16QAM, 64QAM, and 256QAM respectively. In addition, this version of the two-point short-form demodulation reference is unchanged, and the analysis procedure is unchanged, regardless of whether the transmitter uses the carrier phase or not, since the calibration set phase values are derived from the exhibited values. In addition, the two-point short-form demodulation reference of FIG. 3A or 3B is configured to mitigate distortions due to noise and interference including both additive and multiplicative types, due to the use of interpolation between maximum and minimum levels in both amplitude and phase. Therefore, the calibration set values for amplitude and phase, when calculated according to the methods disclosed herein, may include both additive and multiplicative distortions from noise and interference, and those calibration set values may therefore compensate or mitigate message elements that are subjected to the same conditions as the demodulation reference, including both the additive and multiplicative components of noise and interference, according to some embodiments. In summary, selecting the short-form demodulation reference of FIGS. 3A and 3B as the default standard may provide a short but effective modulation level calibration, providing direct mitigation of noise and interference, for both amplitude and phase distortions, and is compatible with both high-performance and reduced-capability devices, in both high-density traffic environments and sparse messaging environments.

Figure 3C:
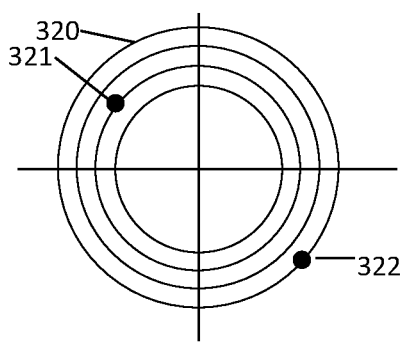
FIG. 3C is a schematic sketch showing another exemplary embodiment of a phase chart for a 2-point short-form demodulation reference specifying two amplitude and phase levels, according to some embodiments.

FIG. 3C is a phase chart showing another exemplary embodiment of a short low-complexity demodulation reference such as a two-point short-form demodulation reference, according to some embodiments. As depicted in this non-limiting example, the four amplitudes of 16QAM are shown as circles 320, and two particular states are shown as points 321 and 322. The first point 321 exhibits the second-lowest phase and amplitude levels, and the second point 322 has the highest amplitude and phase levels. Thus the two points 321, 322 differ in amplitude by two amplitude steps, and they differ in phase by two phase steps. First, the phase step can be determined by noting that the phase of point 322 is greater than 270 degrees, and therefore the point 322 exhibits the maximum phase value. Accordingly, the estimated phase step may be calculated by subtracting the phase of point 322 from 360 degrees, then multiplying the difference by 2 to derive an estimated phase step, which is closest to the standard phase step of 90 degrees in this case. Alternatively, if the receiver knows that the two points 321-322 differ by two phase steps, the receiver may divide the difference in phase by two, and thereby derive the phase step without assuming anything about the carrier phase. All of the phase levels can then be determined by repeatedly adding that phase step to either one of the points 321-322, modulo 360, or by linearly interpolating between them. Counting the number of phases in this case, Nphase=4 which implies either QPSK or 16QAM. The amplitude levels can be determined by noting that the two points 321-322 have different amplitudes, and therefore they are not QPSK modulated which has only one amplitude level. Therefore, the modulation scheme must be QAM, in which case Namp=Nphase, and as mentioned, Nphase=4 so the modulation scheme must be 16QAM. To calculate the remaining amplitude levels of the modulation scheme from the points provided, the receiver must know that one of them exhibits the maximum amplitude level, and that they are separated by twice the amplitude step. This determination may be based on a convention or default or RRC (radio resource control) message or otherwise. Then the amplitude step can be calculated by subtracting the amplitude of the first point 321 from the second point 322 and dividing by two (because they are two amplitude steps apart). The remaining amplitude levels can then be determined by subtracting the amplitude step from the maximum amplitude level as exhibited by point 322, until all four amplitude levels are determined. In this way, all of the amplitude and phase modulation levels of the modulation scheme can be determined if the receiver knows which format of short-form demodulation reference is used. Each message element can then be demodulated by comparing to the calibration set of amplitude and phase levels so determined.

Figure 3D:
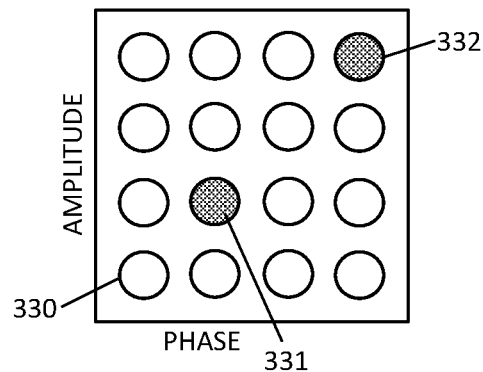
FIG. 3D is a schematic sketch showing another exemplary embodiment of a modulation table for a 2-point short-form demodulation reference specifying two amplitude and phase levels, according to some embodiments.

FIG. 3D is a modulation table showing an exemplary embodiment of a short low-complexity demodulation reference such as a 2-point short-form demodulation reference, according to some embodiments. As depicted in this non-limiting example, the modulation states of 16QAM are shown as circles 330, and two of the modulation states are shown stippled as 331 and 332. The first point 331 exhibits the amplitude and phase one step above the minimum. The second point 332 exhibits the maximum phase and maximum amplitude levels. The two points 331-332 thus differ in phase by two phase steps, and they differ in amplitude by two amplitude steps. The modulation table shows the same set of points as the phase chart of FIG. 3C.

Figure 3E:
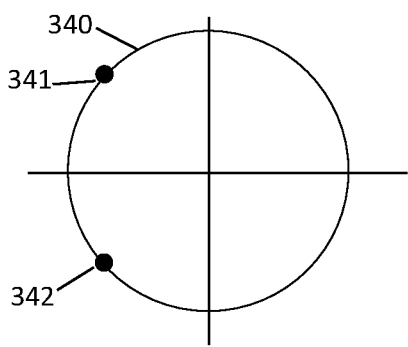
FIG. 3E is a schematic sketch showing an exemplary embodiment of a phase chart for a 2-point short-form demodulation reference for QPSK, according to some embodiments.

FIG. 3E is a phase chart showing an exemplary embodiment of a short low-complexity demodulation reference such as a two-point short-form demodulation reference for a QPSK modulation, according to some embodiments. As depicted in this non-limiting example, the circle 340 represents a particular amplitude, and the two indicated states 341, 342 are modulation states with phase and amplitude as shown. For QPSK, the phase is varied between four values spaced apart by 90 degrees, and the amplitude is held constant. Thus the two points 341 and 342 are at the same radius 340, indicating the same amplitude. The phase of the first point 341 is the minimum phase plus one phase step and the second point 342 is modulated at the minimum phase plus two phase steps. The receiver can determine that Namp=1 since both points 341-342 have the same amplitude, and can determine that the modulation scheme is QPSK because the two points 331-332 are separated by 90 degrees in phase. The receiver can then calculate the remaining phase levels by repeatedly adding that phase step to either of the points, modulo 360.

Figure 3F:
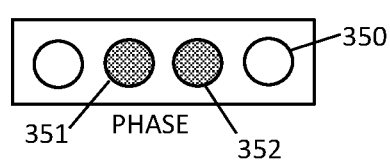
FIG. 3F is a schematic sketch showing an exemplary embodiment of a modulation table for a 2-point short-form demodulation reference for QPSK, according to some embodiments.

FIG. 3F is a modulation table showing an exemplary embodiment of a short low-complexity demodulation reference such as a two-point short-form demodulation reference for QPSK, according to some embodiments. As depicted in this non-limiting example, the modulation table shows the four states 350 of QPSK, with two of the states 351 and 352 stippled. As depicted in this non-limiting example, those two states 351, 352 correspond to two phases which are one phase step apart, or 90 degrees apart, and at the same amplitude. Messages modulated in QPSK can be demodulated using the two-point short-form demodulation reference by calculating the phase step equal to the magnitude of the difference in phase between the two reference elements 351-352, and repeatedly adding or subtracting that phase step from/to one of the exhibited states 351-352, thereby determining the four phase states. FIG. 3F shows the same set of points as FIG. 3E. The receiver can calculate all of the states of the modulation scheme from the short-form demodulation reference.

An advantage of the two-point short-form demodulation reference may be that it is short, only two reference elements. Another advantage may be that the two-point short-form demodulation reference may be added to another message, even a short message, without undue consumption of resources. Another advantage may be that the two-point short-form demodulation reference may serve as a modulation calibration for various orders of quadrature amplitude modulation or phase-shift keying, by calculating the non-exhibited levels based on the amplitude values and phase values provided in the reference elements of the short-form demodulation reference. Another advantage may be that distortions, in amplitude or phase or both, due to noise or interference, may be included in the amplitude and phase values of the reference elements, and therefore those distortions may be canceled when the received reference values are used to demodulate a subsequent message.

Figure 4A:
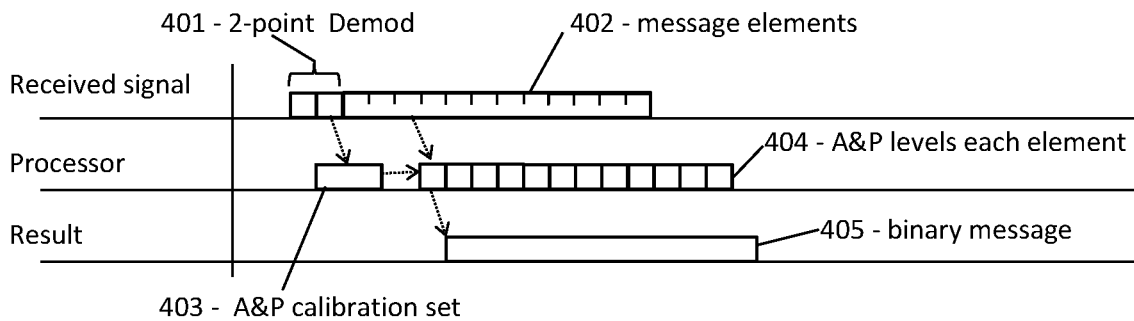
FIG. 4A is a sequence chart showing an exemplary embodiment of a process for demodulating a message using a two-point short-form demodulation reference, according to some embodiments.

FIG. 4A is a sequence chart showing an exemplary embodiment of a low-complexity procedure for providing a two-point short-form demodulation reference, according to some embodiments. The received signal is shown on the first line, a processor on the second line, and results are shown on the third line. As depicted in this non-limiting example, the demodulation reference is a two-point short-form demodulation reference 401, followed by a message 402 which is to be demodulated. In this case, the message 402 is concatenated directly to the reference 401, with no gap. The receiver first analyzes the reference elements of the two-point short-form demodulation reference 401 and thereby determines amplitude and phase calibrations 403. In this case, the 2-point short-form demodulation reference exhibits the maximum and minimum amplitude modulation levels, the minimum phase modulation level, and the next higher phase level (separated by the phase step). The processor may then linearly interpolate between the maximum and minimum amplitude levels to determine intermediate amplitude levels, such as the four amplitude levels of 16QAM, and may include those calculated states in the calibration set 403, and may thereby determine the amplitude levels by which the message elements are modulated. The processor may also extrapolate the phase levels by calculating the difference between the two phases provided, and then adding integer multiples of that difference to the phases provided (modulo 360 degrees), and may thereby determine the phase levels by which the message elements are modulated. Thus the processor can determine the amplitude and phase (A&P) levels of the modulation scheme.

Then, the processor analyzes each element of the message 402, comparing the amplitude of the message element 402 to the calibration set 403, and thereby assigns an amplitude modulation level 404 to each of the message elements. The processor then compares the phase of each message element 402 to the calibration set 403, and thereby assigns a phase modulation (A&P) level 404 to each of the message elements. In addition, each amplitude and phase modulation level in the calibration set may be assigned a binary code or other numerical representation, and the message 402 may thereby be rendered as an output binary image 405. In this case, the message 402 is represented by a series of binary bits 405 by concatenating the amplitude code A and the phase code P for each message element.

Figure 4B:
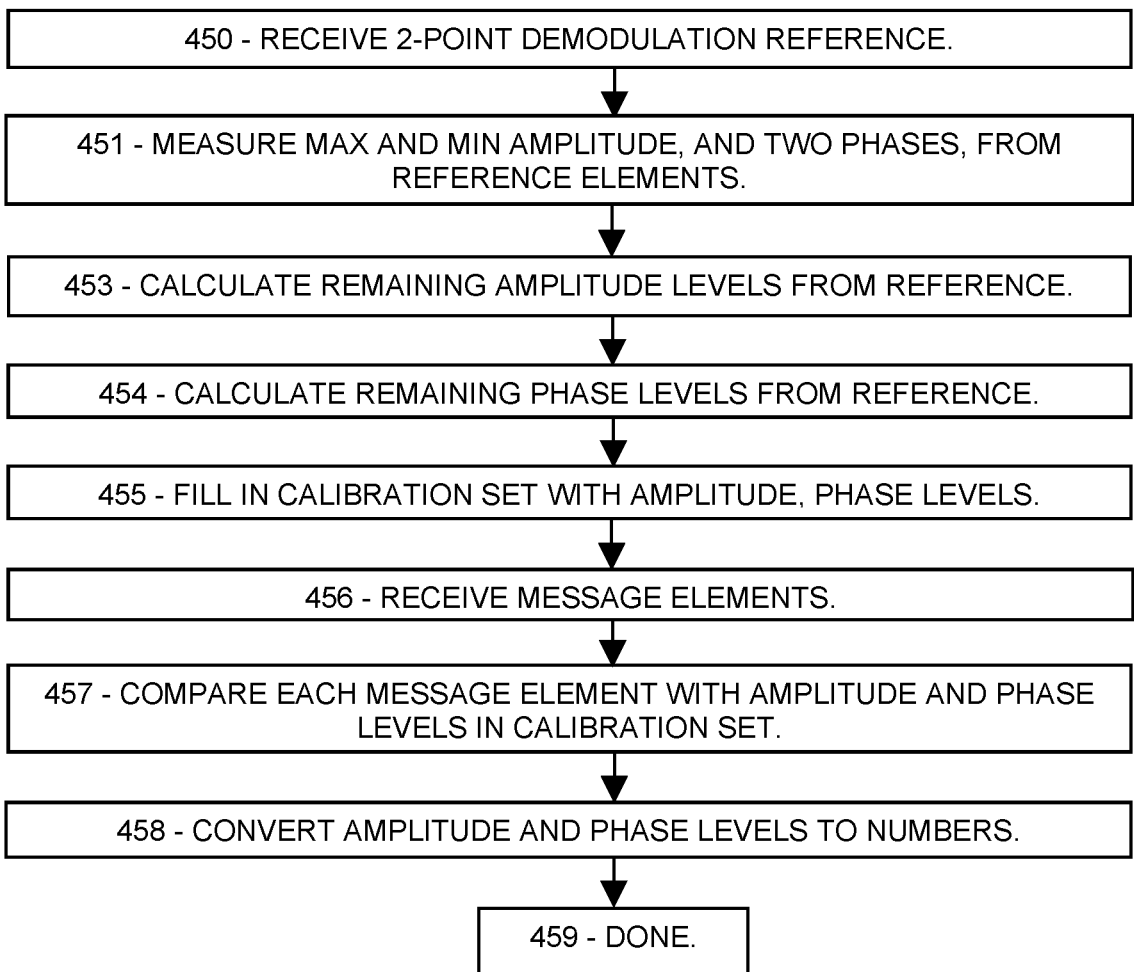
FIG. 4B is a flowchart showing an exemplary embodiment of a process for demodulating a message using a two-point short-form demodulation reference, according to some embodiments.

FIG. 4B is a flowchart showing an exemplary embodiment of a low-complexity procedure for using a demodulation reference, according to some embodiments. As depicted in this non-limiting example, the 2-point short-form demodulation reference again exhibits the maximum and minimum amplitude levels, and the minimum phase, and the next-higher phase level. A receiver compares message elements of a message to reference elements of a two-point short-form demodulation reference, and thereby determines the amplitude and phase modulation levels for each of the message elements.

At 450, a receiving entity receives a two-point short-form demodulation reference and, at 451, measures the maximum and minimum amplitude values as provided in its two reference elements, and also measures the phase values of each of its two reference elements representing a minimum phase and a next-higher phase level. At 453, a processor calculates the remaining amplitude levels by interpolation between the maximum and minimum amplitude levels provided. At 454, the processor calculates the remaining phase levels by extrapolation, by repeatedly adding the phase step (equal to the phase difference between the first two points) to the second provided point, up to 360 degrees. At 455, the calibration set, including all of the modulation levels used in a modulation scheme, has been determined, and a numerical code "A" has been assigned for each amplitude level and a numerical code "P" has been assigned for each phase level. At 456 (if not sooner), the message is received. At 457, each message element is compared to the amplitude and phase modulation calibration levels, thereby determining the amplitude and phase level by which each message element was initially modulated. At 458, a binary representation of the message is prepared by concatenating the amplitude and phase codes of the various message elements, and the procedure is done at 459.

An advantage of providing a two-point short-form demodulation reference may be that it is short, just two reference elements. Another advantage may be that the maximum and minimum amplitude modulation states (or the maximum amplitude level and the adjacent amplitude level, or the minimum amplitude level and the adjacent amplitude level, among other combinations) can be explicitly provided, and likewise the two lowest phase modulation states (or the minimum and maximum phases, or the maximum and the phase step, among other combinations) can be explicitly provided in the short-form demodulation reference, according to some embodiments. The receiver can then determine all the amplitude and phase modulation states of the modulation scheme using the principles and methods disclosed. Another advantage may be that distortions, in amplitude or phase or both, due to noise or interference, may be included in the amplitude and phase values of the reference elements, and therefore those distortions may be canceled when the received reference values are used to demodulate a subsequent message.

The systems and methods further include a one-point short-form demodulation reference, with a length of just one reference element, as in the following examples.

Figure 5A:
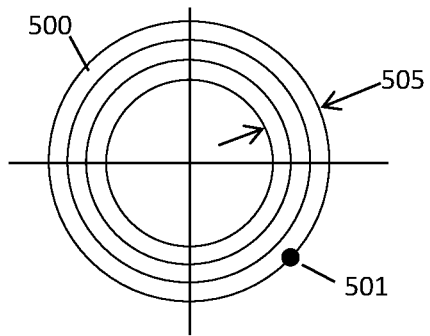
FIG. 5A is a schematic sketch showing an exemplary embodiment of a phase chart for a 1-point short-form demodulation reference, according to some embodiments.

FIG. 5A is a phase chart showing an exemplary embodiment of a very short low-complexity demodulation reference such as a one-point short-form demodulation reference, according to some embodiments. As depicted in this non-limiting example, the circles 500 represent amplitude modulation levels, and the indicated state 501 is a modulation state at the maximum amplitude and at the maximum phase of the modulation scheme. Also shown is the width 505 of the amplitude modulation levels 500, extending from the minimum amplitude to the maximum amplitude. For the case shown, the minimum amplitude is 0.5 times the maximum. The amplitude ratio is the ratio of the minimum amplitude level divided by the maximum amplitude level of the modulation scheme, in this case, which is 0.5. The one-point short-form demodulation reference may be used to demodulate elements of messages modulated in quadrature amplitude modulation or phase-shift keying, if the amplitude ratio is known. The number of amplitude and phase levels can be determined from the phase of the single point 501 if the receiver knows Nphase. The phase step is 360 divided by Nphase, and the remaining phase levels can be found by repeatedly adding the phase step to the exhibited phase, modulo 360.

If, however, the receiver knows the carrier phase but does not know Nphase, then the receiver can calculate a phase step estimate equal to twice the difference between the exhibited phase and the carrier phase, then select the closest standard phase step value, and then repeatedly add that selected phase step to the exhibited phase to obtain all of the phase levels of the modulation scheme. Since the phases are modulo 360, that formula works regardless of whether the exhibited phase is the minimum, maximum, or an intermediate phase, so long as the maximum and minimum phase levels of the modulation scheme are spaced equally from the carrier phase. Due to noise or interference, the phase step calculated from the exhibited phase value may not exactly equal the standard values of 180, 90, 60, and 45 degrees for BPSK, QPSK or 16QAM, 64QAM, and 256QAM respectively. In that case, the receiver can select the closest of the standard values as the phase step, then add that standard phase step repeatedly to the measured phase value of the reference element to determine the other phase values. On the other hand, if the receiver knows the number of phases Nphase, then the receiver can calculate the phase step as 360/Nphase, and then add that phase step repeatedly to the reference element phase value. In either case, the phase values in the calibration set may correspond to the phase values in a subsequent message, since they both include the current noise and interference levels. Hence the calibration set, derived from the one-point short-form demodulation reference, may thereby mitigate that noise and interference in demodulating the message elements.

The amplitude levels can be found in a similar way, given the amplitude ratio. If the amplitude ratio is 1.0, there is no amplitude modulation and Namp=1, in which case the modulation scheme is BPSK or QPSK according to the number of phase levels as determined above. If the amplitude ratio is less than 1, the modulation scheme is QAM, and the number of amplitude levels equals the number of phase levels. Those amplitude levels can be found by calculating a second amplitude value according to the exhibited amplitude value and the amplitude ratio. If the exhibited amplitude value is the maximum amplitude level, then the second amplitude equals the exhibited amplitude value times the amplitude ratio. If the exhibited amplitude value is the minimum amplitude level, then the second point amplitude is the exhibited amplitude value divided by the amplitude ratio. In this example, the receiver is expected to know, by convention or default or messaging or otherwise, whether the single point exhibits the minimum or maximum amplitude level of the modulation scheme.

In some embodiments, additional information may be multiplexed in the provided amplitude ratio, to assist the receiver in processing the one-point short-form demodulation reference. For example, the amplitude ratio may be configured to be the maximum amplitude level divided by the minimum amplitude level if the exhibited amplitude level is the minimum, and the inverse of that if the exhibited level is the maximum. Alternatively, the sign of the amplitude ratio may be set by whether the exhibited amplitude value is the maximum or minimum. In either case, the receiver may determine the opposite extremum (that is, the minimum level if the maximum is exhibited, or the maximum if the minimum is exhibited), and thereby interpolate the remaining levels of the modulation scheme.

Having determined the maximum and minimum amplitude levels, the receiver can calculate the remaining amplitude levels by interpolating between the exhibited amplitude value and the second amplitude value, representing the maximum and minimum amplitude levels of the modulation scheme. Therefore, a single modulated point is sufficient to determine all of the modulation states of a modulation scheme including PSK and QAM type modulation schemes. Since the reference element amplitude value includes the effects of noise and interference, the calibration set values obtained by this method may be used to demodulate the message element amplitude values with the same noise and interference distortions, and thereby at least partially mitigate those distortions.

Figure 5B:
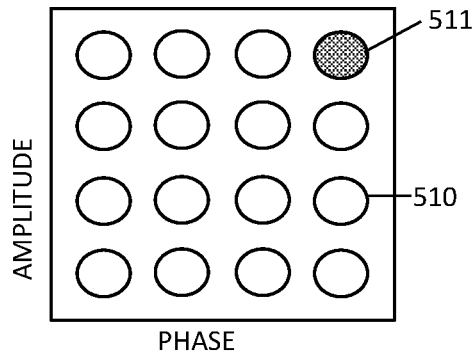
FIG. 5B is a schematic sketch showing an exemplary embodiment of a modulation table for a 1-point short-form demodulation reference, according to some embodiments.

FIG. 5B is a modulation table showing an exemplary embodiment of a very short low-complexity demodulation reference such as a one-point short-form demodulation reference, according to some embodiments. As depicted in this non-limiting example, the table shows the sixteen states 510 of 16QAM, with one state 511 stippled, corresponding to the state 501 shown in the previous figure. The state 511 corresponds to a maximum-amplitude, maximum-phase modulation state. Thus the two charts of FIGS. 5A and 5B show the same information but in different forms. Messages modulated in 16QAM, or other orders of quadrature amplitude modulation, as well as BPSK and QPSK, can be demodulated using the depicted modulation table, as long as the amplitude ratio is known, and the receiver knows whether the exhibited amplitude represents the minimum or maximum level. First, the phase levels can be found by determining the phase step from the phase level shown (by doubling the separation between the exhibited phase and 360 degrees, in the example shown) or by convention or by dividing 360 by Nphase, then subtracting the phase step repeatedly from the maximum phase level, modulo 360. The extrapolation also determines Nphase according to the number of phase steps that fit in 360 degrees. The amplitude levels can be found by interpolation between the maximum and minimum amplitude, using the exhibited amplitude as one limit of interpolation and a second amplitude as the other limit of interpolation, wherein the second amplitude equals the exhibited amplitude value divided by the amplitude ratio if the exhibited amplitude is the minimum, or the second amplitude equals the exhibited amplitude times the amplitude ratio if the exhibited amplitude is the maximum.

In another embodiment, a modified amplitude ratio may be provided, configured to accommodate cases wherein the receiver does not know whether the exhibited amplitude is the maximum or minimum level. The modified amplitude ratio depends on whether the exhibited amplitude value is the minimum or maximum level of the modulation scheme. Hence, the modified amplitude ratio accommodates both possibilities. If the exhibited amplitude is the minimum, then the modified amplitude ratio is the maximum divided by the minimum amplitude levels of the modulation scheme. If the exhibited amplitude is the maximum, then the modified amplitude ratio is the minimum divided by the maximum. The receiver can then calculate a second amplitude value by multiplying the exhibited amplitude value by the modified amplitude ratio, and can interpolate between that second amplitude value and the exhibited amplitude value to determine the intermediate amplitude levels, without knowing whether the exhibited amplitude is the maximum or the minimum. The modified amplitude ratio, being greater or less than 1 according to whether the minimum or maximum amplitude is exhibited, thereby determines the maximum and minimum interpolation limits, regardless of whether the exhibited amplitude is the minimum or maximum level.

Figure 5C:
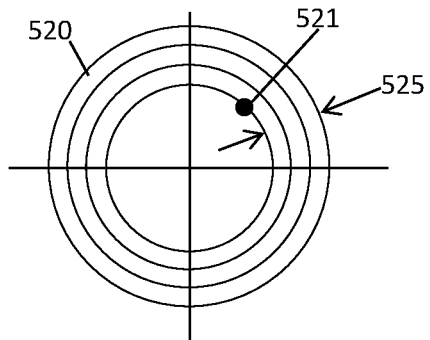
FIG. 5C is a schematic sketch showing another exemplary embodiment of a phase chart for a 1-point short-form demodulation reference, according to some embodiments.

FIG. 5C is a phase chart showing another exemplary embodiment of a very short low-complexity demodulation reference such as a one-point short-form demodulation reference, according to some embodiments. The one-point demodulation reference may be used to calibrate the amplitude and phase levels by which the message elements of messages are modulated. As depicted in this non-limiting example, the circles 520 represent amplitude modulation levels. Unlike the previous example, the indicated state 521 is modulated at the minimum amplitude and at the minimum phase. Also shown is the width of the amplitude levels as 525, extending from the minimum amplitude to the maximum amplitude. For the case shown, the amplitude ratio (minimum/maximum) is 0.5; hence the maximum amplitude level is the exhibited level divided by the amplitude ratio. The remaining amplitude and phase levels may be calculated by interpolation (for amplitudes) and extrapolation (for phases) as described above. The number of amplitude and phase levels can be determined from the phase of the single point 521, since the phase step is generally twice the initial phase value (if the minimum phase), or twice the difference between 360 and the exhibited phase (if the maximum phase), provided that the phases avoid the zero-degree carrier phase for noise immunity. That phase step can be added to the initial point 521 repeatedly to calculate the remaining points (but not greater than 360 degrees). This determines the number of phase levels in the modulation scheme. If the modulation scheme is QAM, then the number of amplitude levels is the same as the number of phase levels, and those amplitude levels can be found by interpolating between the minimum level (which is exhibited in the one-point short-form demodulation reference in this case) and the maximum amplitude level (calculated by dividing the minimum by the amplitude ratio). If, however, the amplitude ratio is 1.0, amplitude modulation is not used, and the modulation scheme is either BPSK or QPSK, depending on the value of the first point's phase. Specifically, if the exhibited phase is 45 degrees or 315 degrees, the modulation scheme is QPSK, and if the exhibited phase is 90 or 270 degrees, it is BPSK). In another embodiment, the receiver does not know the subcarrier phase and cannot determine a value for the phase of the single point, Nevertheless, if the receiver knows the modulation scheme (in this case 16QAM), the receiver can readily calculate the phase step (90 degrees in the depicted case) and repeatedly add that phase step to the exhibited phase point, thereby determining all of the phase levels of the modulation scheme, without knowledge of the carrier phase or whether the exhibited phase is maximum or minimum or an intermediate level. It is sufficient for the receiver to know Nphase to fill in all the other phase levels of the modulation scheme. In either case, then, the complete set of amplitude and phase modulation levels for the modulation scheme can be determined from the single short-form demodulation point and the amplitude ratio if either the modulation type or Nphase is known to the receiver.

Figure 5D:
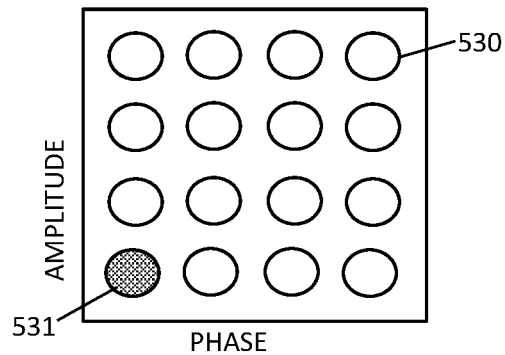
FIG. 5D is a schematic sketch showing another exemplary embodiment of a modulation table for a 1-point short-form demodulation reference, according to some embodiments.

FIG. 5D is a modulation table showing an exemplary embodiment of a very short low-complexity demodulation reference such as a one-point short-form demodulation reference, according to some embodiments. As depicted in this non-limiting example, the table shows the sixteen states 530 of 16QAM, with one state 531 stippled, corresponding to the state 521 shown in the previous figure. The state 531 corresponds to a minimum-amplitude, minimum-phase modulation state. Thus the two charts of FIGS. 5C and 5D show the same information but in different forms. Messages modulated in 16QAM, or other order of quadrature amplitude modulation, as well as BPSK and QPSK, can be demodulated using the depicted modulation table, as long as the receiver knows the amplitude ratio, whether the exhibited amplitude value is the minimum or maximum amplitude level, and the number of phase levels of the modulation scheme. For a scheme not employing amplitude modulation, such as BPSK and QPSK, the amplitude ratio is 1.0. The phase levels can be calculated by extrapolation in phase from the phase exhibited if the carrier phase is known, or from 360/Nphase if Nphase is known. The amplitude levels can be calculated by interpolation between the maximum and minimum amplitude, using the exhibited amplitude and the known amplitude ratio.

Figure 5E:
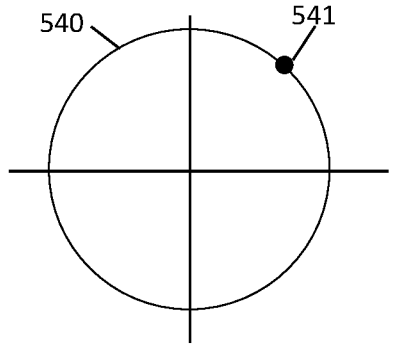
FIG. 5E is a schematic sketch showing an exemplary embodiment of a phase chart for a 1-point short-form demodulation reference for QPSK, according to some embodiments.

FIG. 5E is a phase chart showing an exemplary embodiment of a very short low-complexity demodulation reference such as a one-point short-form demodulation reference for QPSK, according to some embodiments. As depicted in this non-limiting example, the circle 540 represents the constant amplitude of the modulation scheme. The indicated state 541 is modulated at the single amplitude and at the minimum phase of the modulation scheme. The width of the amplitude levels is zero in this case, so the minimum amplitude equals the maximum amplitude as shown, and the amplitude ratio is 1.0. The one-point short-form demodulation reference may be used to calibrate elements of messages modulated in QPSK, after calculating the remaining phase levels by phase extrapolation, as discussed previously.

Figure 5F:
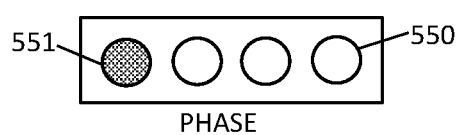
FIG. 5F is a schematic sketch showing an exemplary embodiment of a modulation table for a 1-point short-form demodulation reference for QPSK, according to some embodiments.

FIG. 5F is a modulation table showing an exemplary embodiment of a low-complexity demodulation reference such as a one-point short-form demodulation reference, according to some embodiments. As depicted in this non-limiting example, the table shows the four states 550 of QPSK, with one state 551 stippled, corresponding to the state 541 shown in the previous figure. The state 551 corresponds to a minimum-phase modulation state, and with constant amplitude. Thus the two charts of FIGS. 5E and 5F show the same information but in different forms.

An advantage of the one-point short-form demodulation reference may be that it is very small, just one reference element, and thus can be added to messages with only a very slight increase in resource usage. Another advantage may be that it may be easy for receiver processors to use the short-form demodulation reference to demodulate messages, since the amplitudes of the message elements are all between the minimum and maximum amplitude levels as calculated according to the amplitude ratio, and the phase of the message element is between the maximum and minimum phase levels as calculated according to the number of phase levels. Another advantage may be that distortions, in amplitude or phase or both, due to noise or interference, may be included in the amplitude and phase values of the reference elements, and therefore those distortions may be substantially canceled when the received reference values are used to demodulate a subsequent message.

Figure 6A:
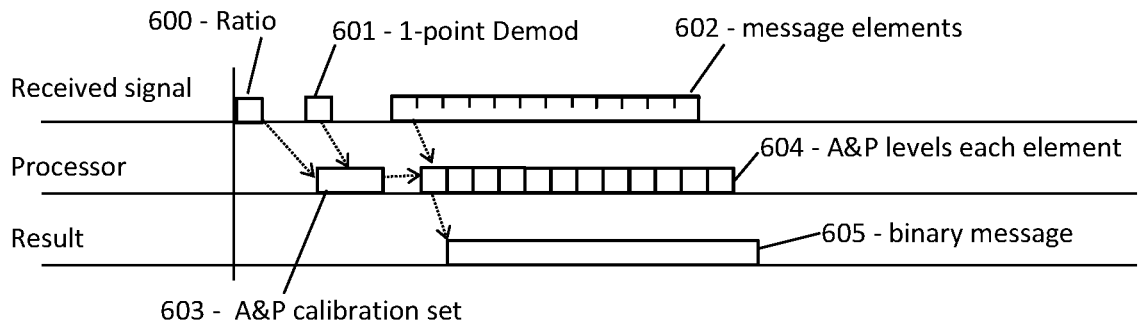
FIG. 6A is a sequence chart showing an exemplary embodiment of a process for demodulating a message using a one-point short-form demodulation reference, according to some embodiments.

FIG. 6A is a sequence chart showing an exemplary embodiment of a low-complexity procedure for providing and using a one-point short-form demodulation reference, according to some embodiments. A received signal is shown on the first line, a processor on the second line, and a result is shown on the third line. As depicted in this non-limiting example, an amplitude ratio 600, equal to the minimum amplitude level in the modulation scheme divided by the maximum, is initially received as an RRC message, for example. A demodulation reference 601 is later received, in this case a one-point short-form demodulation reference 601, followed later by a message 602 which is to be demodulated. The short-form demodulation reference 601 is not time-synchronized with the message 602 in this case, other than to precede the message 602. In some embodiments, the ratio message 600 may also indicate whether the short-form demodulation reference 601 exhibits the minimum or maximum amplitude level of the modulation scheme. In other embodiments, that amplitude information may be established by a system information message, or by convention, or otherwise. In some embodiments, the amplitude ratio is configured to indicate whether the minimum or maximum amplitude is exhibited, such as by making the amplitude ratio negative if the minimum amplitude is exhibited and positive if the maximum amplitude is exhibited, for example. In each case, the processor can determine how to use the amplitude ratio 600 to calculate the other, non-exhibited, amplitude levels.

The processor then analyzes the sole reference element of the one-point short-form demodulation reference 601 using the provided amplitude ratio 600, and thereby determines the amplitude and phase calibration set 603, which includes the values of the amplitude levels and the phase values of the modulation scheme. In this example, the 1-point short-form demodulation reference includes the maximum amplitude level and the minimum phase level. The processor may determine the phase modulation levels by, for example, calculating a phase step size equal to twice the minimum phase provided, and dividing 360 degrees by that phase step. Alternatively, if the modulation scheme is already known, or if the number of phase levels is already known, the processor may calculate the phase step size equal to 360 degrees divided by the number of phase levels. The processor may then add integer multiples of that step size to the minimum phase provided (modulo 360 degrees), and may thereby determine the phase levels by which the message elements are modulated. As a third option, the processor may multiply the minimum phase by odd integers to determine the remaining phase levels, up to 360 degrees.

In addition, the processor may calculate the amplitude levels based on the reference element and the amplitude ratio. If the short-form demodulation reference 601 exhibits the maximum amplitude level, the processor may calculate a minimum amplitude level by multiplying the maximum amplitude level by the amplitude ratio, and may then interpolate between the maximum and minimum amplitude levels to determine intermediate levels. If the short-form demodulation reference 601 exhibits the minimum amplitude level, the processor may calculate a maximum amplitude level by dividing the minimum amplitude level by the amplitude ratio. If the amplitude ratio is 1, there is only one amplitude level and the modulation scheme is not amplitude modulated. If the amplitude ratio is not 1, the number of amplitude levels equals the number of phase levels. The amplitude and phase levels, thus calculated from the reference amplitude value and the reference phase value, plus attendant calculations as described, form the amplitude and phase (A&P) calibration set 603.

Then, the processor analyzes each resource element of the message 602, comparing each message amplitude value and each message phase value to the amplitude levels and phase levels in the calibration set 603, and thereby assigns an amplitude modulation level and a phase modulation level 604 to each of the message elements 602. Then each amplitude and phase modulation level may be assigned a binary code, or other numerical code, and the entire message 602 can then be represented by a series of binary bits 605 by concatenating, or otherwise combining, the codes for each message element. (If the amplitude ratio is 1, the amplitude comparison step may be omitted, and the binary codes representing amplitude may be omitted, since only phase modulation is then relevant.)

Figure 6B:
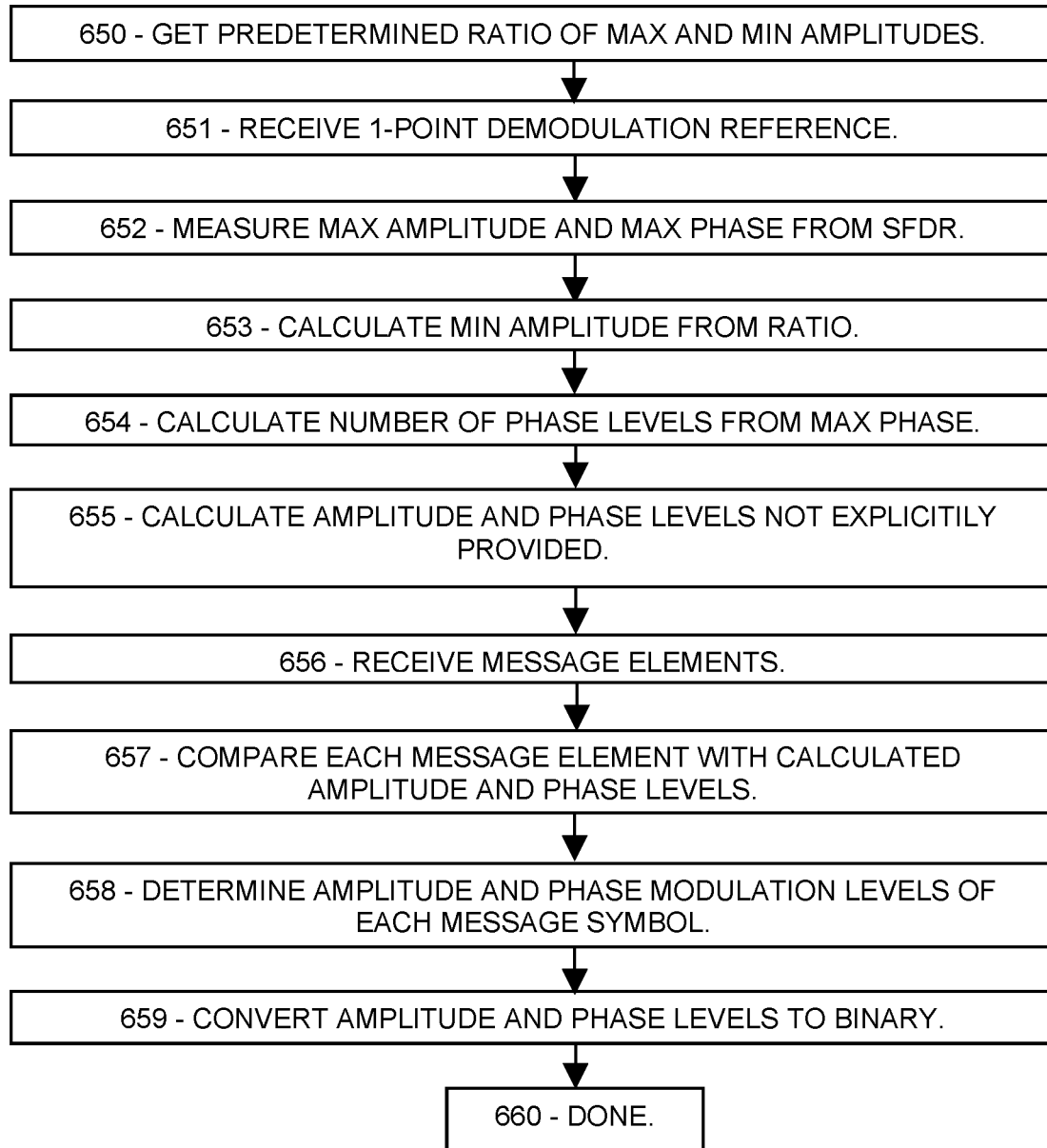
FIG. 6B is a flowchart showing an exemplary embodiment of a process for demodulating a message using a one-point short-form demodulation reference, according to some embodiments.

FIG. 6B is a flowchart showing an exemplary embodiment of a low-complexity procedure for using a demodulation reference, according to some embodiments. As depicted in this non-limiting example, a receiver compares elements of a message to calibrations based on a one-point short-form demodulation reference, and thereby determines the modulation levels, in amplitude and phase, for each of the message elements.

At 650, the receiving entity either obtains or already knows the amplitude ratio, which is the ratio of the minimum to maximum amplitude levels of the modulation scheme that the message is modulated in. The amplitude ratio may be a standard convention and built-in for example, or it may be provided from an information source such as a network database, or provided as part of a system information message or a RRC message, or multiplexed in the amplitude ratio value, or otherwise available to the receiving entity. At 651, the receiving entity receives a one-point short-form demodulation reference (such as that of FIG. 5A) and, at 652, measures the maximum amplitude value and, in this case, the maximum phase value, as exhibited in the short-form demodulation reference. At 653, the entity calculates a minimum amplitude modulation level by multiplying the maximum amplitude times the amplitude ratio. At 654, the entity calculates a phase step size equal to twice the difference between 360 degrees and the maximum phase value, and a number of phase levels equal to 360 degrees divided by the phase step size. (In another embodiment, the network may indicate the number of phase levels Nphase in the RRC message or the system information message along with the amplitude ratio, in which case the receiver can determine the phase step and the other phase levels without assuming that the exhibited phase has a particular relationship with the carrier phase.) The entity also calculates a number of amplitude levels. If the amplitude ratio is 1, then there is only one amplitude level and the modulation scheme is BPSK or QPSK. If the amplitude ratio is different from 1, then the modulation scheme is some order of QAM and the number of amplitude levels is equal to the number of phase levels.

At 655 the entity calculates the amplitude levels and phase levels not explicitly provided, using interpolation and extrapolation as described above, thereby completing the calibration set. In this case, the entity repeatedly subtracts the phase step from the exhibited reference phase value, modulo 360, and thereby determines all of the phase levels in the calibration set. At 656, the entity receives the message to be demodulated. At 657, the entity compares each element of the message to the amplitude and phase levels in the calibration set. At 658, each message amplitude value of each element of the message is then 658 assigned a specific modulation state by matching the message amplitude value with one of the calibrated amplitude levels, and each message phase value of each element of the message is assigned a specific modulation state by matching the message phase value with one of the calibrated phase levels. At 659, a binary representation of the message is prepared by concatenating the amplitude and phase codes of the various message elements, and is done at 660.

In some cases, the receiver may already know the number of amplitude and phase levels. For example, if a particular modulation scheme has already been agreed upon, the receiving entity only needs the amplitude and phase values in the one-point short-form demodulation reference, and the amplitude ratio, to calibrate all of the amplitude and phase levels in the calibration set. Thus if the number of phase levels in the modulation scheme is already known, the processor can calculate the phase step size equal to 360 degrees divided by the number of phase levels, and can then calculate the additional phase levels by adding the phase step size to the exhibited phase, modulo 360. If the number of amplitude levels in the modulation scheme is already known, the processor can determine a second amplitude by multiplying the amplitude ratio by the exhibited amplitude value, and then can calculate the intermediate amplitude levels by interpolation.

An advantage of providing a one-point short-form demodulation reference may be that it is very short, just one reference element. Another advantage may be that the maximum or minimum amplitude modulation and the maximum or minimum phase modulation values can be explicitly provided in the short-form demodulation reference. Another advantage may be that additional amplitude and phase levels may be calculated from the values explicitly exhibited, if the amplitude ratio is provided or already known to the receiver. Another advantage may be that distortions, in amplitude or phase or both, due to noise or interference, may be included in the amplitude and phase values of the reference elements, and therefore those distortions may be substantially canceled when the received reference values are used to demodulate a subsequent message.

Figure 7A:
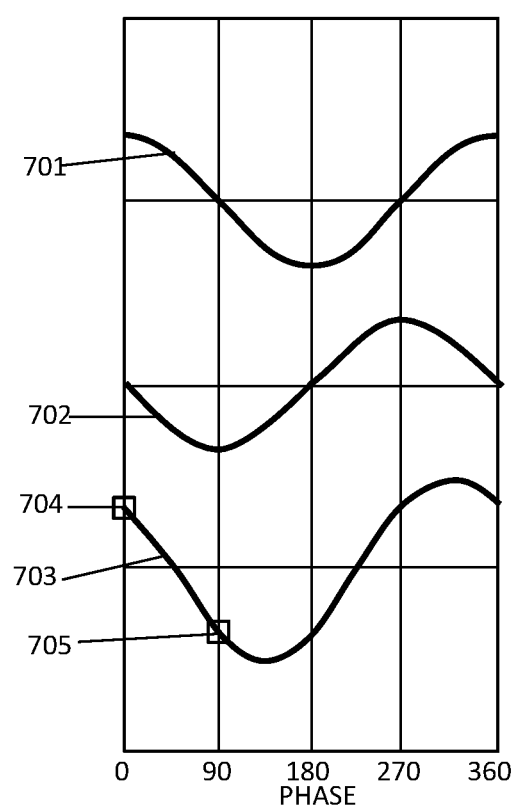
FIG. 7A is a schematic showing an exemplary embodiment of a wave modulated using pulse-amplitude modulation, according to some embodiments.

FIG. 7A is a schematic showing an exemplary embodiment of a wave modulated using pulse-amplitude modulation, according to some embodiments. As depicted in this non-limiting example, waves representing modulated signals are shown as in an oscilloscope display, with voltage vertical and time horizontal. The intent is to illustrate PAM (pulse-amplitude modulation) and show how it can be demodulated using the systems and methods disclosed herein. In PAM, a message element may be modulated by adding two sinusoidal signals, a first signal with a first amplitude and a first phase of zero degrees, plus a second signal with a second amplitude and a second phase of 90 degrees. The zero-degree signal is called a "real" component, and the 90-degree signal is the "imaginary" component. The first and second amplitudes are then separately modulated and combined before transmission. For example, 16QAM may be represented as a summed signal in which the first amplitude is one of four predetermined levels, and the second amplitude is separately configured to one of the four levels, thereby providing 16 valid modulation states when combined. Negative amplitudes are equivalent to 180-degree phase reversals. The receiver can then demodulate the signal by measuring the real and imaginary components separately.

In the figure, a first wave 701 is phased at zero degrees (that is, its maximum value falls at zero degrees, as in a cosine curve) and has a particular amplitude as shown. The second wave 702 is phased at 90 degrees, and has another amplitude (in this case negative) at the 90-degree phase. The third wave 703 is a summed wave formed by adding the first and second waves 701-702, and thus is the PAM waveform that would be transmitted using the first and second waves 701, 702 as the real and imaginary components. A receiver, upon detecting the third wave 703, can demodulate it by measuring the zero-degree "real" amplitude, indicated as a square 704 at zero degrees where the imaginary wave passes through zero, and by measuring the 90-degree "imaginary" amplitude 705 where the real wave crosses zero. The receiver can thereby determine the modulation state of the message element by comparing those amplitudes to a modulation constellation.

Figure 7B:
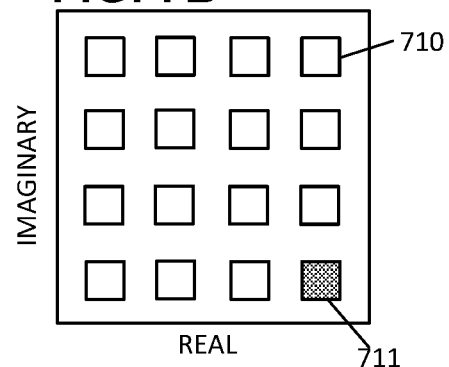
FIG. 7B is a modulation table showing an exemplary embodiment of a demodulation scheme based on real and imaginary components, according to some embodiments.

FIG. 7B is a constellation table showing an exemplary embodiment of a demodulation scheme based on real and imaginary components, according to some embodiments. As depicted in this non-limiting example, modulation states 710 are depicted as squares with a real amplitude shown in the horizontal direction and the imaginary amplitude vertically. In this case, the modulation scheme is 16QAM, and the real and imaginary amplitudes may have positive and negative values. One of the modulation states is stippled 711, representing a maximum real amplitude and a minimum imaginary amplitude. Hence, the state 711 corresponds to the wave 703.

The systems and methods disclosed herein are readily applicable to PAM-modulated messages, with real and imaginary substituting for amplitude and phase, according to some embodiments. Other technologies for modulation and demodulation of wireless signals may likewise be employed with the short-form demodulation references and the processing methods disclosed herein, with straightforward adaptation such as substituting amplitude-phase states for real-imaginary states, for example. Thus, a wide range of modulation technologies may be demodulated using the disclosed systems and methods, according to some embodiments.

Figure 8A:
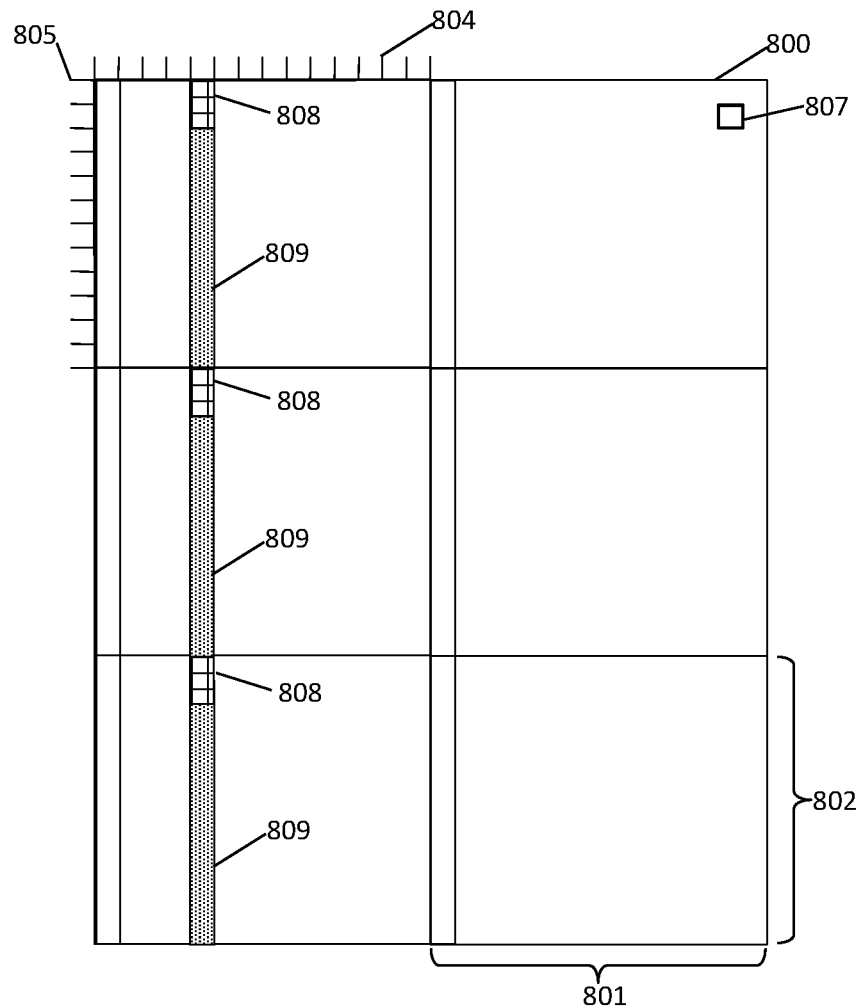
FIG. 8A is a schematic showing an exemplary embodiment of a resource grid with two-point short-form demodulation references interspersed within a message, according to some embodiments.

FIG. 8A is a sketch showing an exemplary embodiment of a resource grid 800 according to some embodiments. One slot is indicated as 801 and one resource block as 802. Symbol times are marked at 804 and subcarriers as 805. A single resource element is shown as 807. The first symbol time is outlined. As depicted in this non-limiting example, a message 809, shown in stipple, is frequency-spanning in the fifth symbol period. Demodulation references 808, shown in grid hatch, are two-point short-form demodulation references in this case. Each two-point short-form demodulation reference 808 occupies just two resource elements, inserted among the message elements. In this case, the first two subcarriers in each resource block are used as demodulation references 808 throughout the message 809. Each two-point short-form demodulation reference 808 includes sufficient amplitude and phase information to update all of the amplitude and phase levels of the calibration set in the presence of current interference, and thereby improves the interference mitigation of the message 809. Importantly, the average distance (in frequency) from each message element to the closest demodulation reference is only 3 subcarriers, yet the additional resource usage is less than 17%. The figure thus demonstrates that inserting a two-point short-form demodulation reference 808 in each resource block of a frequency-spanning message 809 provides time-frequency recalibrations of modulation levels, and localized recalibrations for improved interference mitigation, yet causes only a small increase in resource and energy usage, according to some embodiments.

Figure 8B:
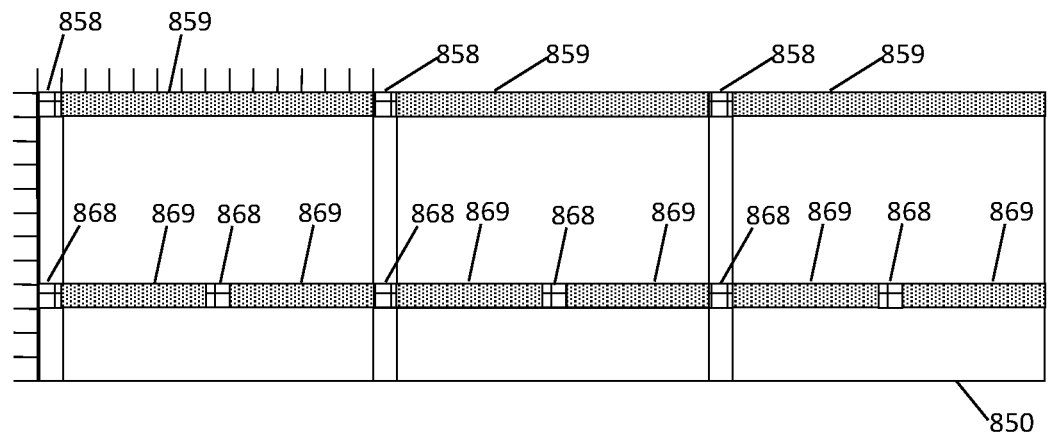
FIG. 8B is a schematic showing an exemplary embodiment of a resource grid with one-point short-form demodulation references interspersed within two messages, according to some embodiments.

FIG. 8B is a sketch showing an exemplary embodiment of a resource grid 850 according to some embodiments. As depicted in this non-limiting example, the resource grid 850 includes three slots and one resource block. Two time-spanning messages are shown in subcarriers 1 and 9. Each message is interspersed with one-point short-form demodulation references. A first message 859 includes a one-point short-form demodulation reference 858 in the first symbol period of each slot. The one-point short-form demodulation references 858 thereby provide sufficient modulation information to refresh the calibration set on the time scale of one slot, at a cost of only about 7% of the message resource elements.

The figure also shows a second message 869 in the ninth subcarrier. The second message 869 is interspersed by one-point short-form demodulation references 868 in every seventh symbol time, thereby providing interference mitigation on a time scale corresponding to a half-slot, for a resource usage increase of about 14%. The average distance from a message element to the nearest reference element is reduced to 2 symbol periods in the depicted example. Such close proximity between message 869 and references 868 provides further improved interference mitigation.

The updated demodulation information provided in the one-point short-form demodulation references 808 or 858 or 868 may be employed in various ways. In one embodiment, the receiver may be configured to demodulate each portion of the message 809 or 859 or 869 according to the updated modulation levels provided by the immediately preceding short-form demodulation reference 808 or 858 or 868. In that case, each portion of the message 809 or 859 or 869 is demodulated according to the immediately preceding short-form demodulation reference 808 or 858 or 868.

In a second embodiment, the receiver may be configured to demodulate each portion of the message 809 or 859 or 869 by averaging the two short-form demodulation references 808 or 858 or 868 adjacent to that message portion, that is, by averaging the corresponding modulation levels in the short-form demodulation references 808 or 858 or 868 immediately preceding and immediately following each message portion 809 or 859 or 869. For example, the receiver may average each corresponding amplitude level in the preceding and following short-form demodulation references 808 or 858 or 868, and also average each corresponding phase level of the two short-form demodulation references 808 or 858 or 868, and then may demodulate the intervening message portion according to those average amplitude and phase levels. By accounting for interference at both ends of each message portion, the receiver may mitigate variable interference more accurately than using just the preceding short-form demodulation reference to demodulate the message portion.

In a third embodiment, the receiver may be configured to calculate a weighted average for each amplitude and phase level in the modulation scheme. The weighted average may be obtained by weighting the immediately preceding and immediately following short-form demodulation references. The weighting may be according to the distance, in time or frequency, between each message element and the two proximate short-form demodulation references. For example, the calibration set for each message element may be calculated by interpolating between the preceding and following demodulation references. For example, the receiver may demodulate a particular message element that is in the middle of the message portion (and hence equidistant from the preceding and following short-form demodulation references) by weighting the preceding and following values equally. For the first message element in the message portion, on the other hand, the preceding short-form demodulation reference may be weighted heavily (since it is closer) and the following short-form demodulation reference may be weighted only lightly. Likewise, for the last message element in a message portion, the receiver may heavily weight the following short-form demodulation reference and lightly weight the preceding one. In this way, the receiver may interpolate between the preceding and following demodulation reference, and thereby calculate a distance-weighted calibration set associated with each message element according to its distance from the preceding and following demodulation references, and then may demodulate each element of the message using that weighted average. The resulting demodulation may thereby mitigate variable interference more effectively than a non-weighted average.

In a fourth embodiment, the receiver may be configured to average a plurality of the preceding short-form demodulation references, and optionally one or more of the following short-form demodulation references as well, in order to obtain a more accurate determination of the levels of the modulation scheme. Averaging multiple demodulation references may provide a more precise determination of the correct demodulation levels when there is random noise in the receiver, such as electronic noise, which is then amplified in the amplifier of the receiver. In some cases, noise may be relatively stable or slowly changing in time or frequency, in which case the averaging of several of the short-form demodulation references may provide a more precise determination of the levels.

Interference, on the other hand, is generally highly structured in frequency and time because it is likely due to competing messages from adjacent cells, or from electrical machinery or the like. Averaging multiple short-form demodulation references may be counter-productive when interference is larger than noise, because the interference generally changes rapidly, such as changing between successive instances of the demodulation reference. If the interference changes significantly over a time equal to the averaging time of the short-form demodulation references, then the message elements that immediately follow those changes in the interference are likely to be incorrectly demodulated. Therefore, when interference is greater than noise, the weighted-average embodiment described above, involving a weighted average between two short-form demodulation references that precede and follow the message section, may provide better mitigation and fewer message faults, than averaging multiple preceding and multiple following short-form demodulation references. In contrast, when noise is greater than interference (and is sufficiently stable in time or frequency), then in that case the averaging of multiple short-form demodulation references may provide a more accurate set of level values than a single short-form demodulation reference.

In some embodiments, a formula may be provided to assist user devices and base stations in deciding which type of averaging is expected to result in fewest message faults, according to the current conditions. Conditions that may affect the choice may include factors such as the traffic density, the prior fault rate, the average noise amplitude, the maximum range of interference fluctuations, and the like. The formula may be based on machine learning and/or artificial intelligence. The formula may be configured to provide, as output, the most suitable type of averaging or interpolating of short-form demodulation reference values, according to the current network and background and messaging conditions. For example, if noise dominates, the formula may recommend averaging multiple short-form demodulation references to obtain a more accurate value of each modulation level, whereas if interference dominates, the formula may recommend not averaging at all, or else using the weighted averaging based on distance from the preceding and following short-form demodulation references. In this way, the formula may assist the receiver in mitigating both electronic noise and fluctuating interference while minimizing message faults under both conditions.

In some embodiments, a short-form demodulation reference may indicate the beginning and/or ending of a message. User devices often have difficulty identifying downlink control messages due to the large number of possible positions and sizes of the messages. User devices are expected to test all of the possible combinations of starting location and length of possible downlink control messages by unscrambling each candidate message and comparing to an included CRC, for example. The short-form demodulation reference can greatly simplify this process by indicating, with a characteristic pattern of reference elements, the beginning and/or ending of a message. For example, a two-point short-form demodulation reference having the maximum amplitude and phase in its first reference element and the minimum amplitude and phase in its second reference element, can be placed at the start of the message, to indicate where the message begins. The end of the message may be indicated by another, optionally different, pattern of short-form demodulation reference, such as the minimum amplitude and phase followed by the maximum amplitude and phase. The receiver may be configured to search for the beginning and ending patterns among the received elements, and thereby identify messages, or at least greatly reduce the number of candidate messages that the receiver needs to test. In addition, the two-point short-form demodulation references at the beginning and ending of the message may assist in demodulating the message.

An advantage of providing multiple short-form demodulation references, such as one-point or two-point short-form demodulation references, interspersed among portions of a message, may be that the modulation levels of the message elements may be recalibrated frequently thereby, resulting in interference mitigation on short time and frequency scales. In a dense radio environment, with large numbers of devices transmitting on various frequencies at various times, message faults may be reduced by providing demodulation recalibrations in close proximity to the message elements they are intended to demodulate. Use of a short demodulation format, such as a short-form demodulation reference occupying just one or two resource elements, may minimize the additional energy consumed and electromagnetic background generated. Another advantage may be that distortions, in amplitude or phase or both, due to noise or interference, may be included in the amplitude and phase values of the reference elements, and therefore those distortions may be canceled in a subsequent message demodulated using those reference values.

Numerous versions of short-form demodulation references are disclosed herein, each with different properties, and many others are possible using the mathematical relationships discussed, or other equivalent mathematical relationships. Selecting which one to use in any messaging situation is a complex problem. An algorithm may be developed to select an appropriate or optimal type of short-form demodulation reference depending on wireless conditions, the message, capabilities of the transmitter and receiver, current traffic conditions, QoS requested, and many other considerations. A 4-point short-form demodulation reference provides more information and redundancy than the 2-point version, while the 1-point version is very short but requires that the amplitude ratio be predetermined. Other-point versions (3, 6, etc. points) are also possible. In some applications, keeping the message short may be paramount, whereas in other applications the additional redundancy and reliability of the 4-point version may be preferred. Some applications may prioritize low latency, while others may require high reliability, and still others may need reduced complexity. Different versions may be optimal for different modulation schemes, such as those with and without amplitude modulation. The transmitting processor may select the size and format according to each message situation. Alternatively, a convention may be established favoring one of the short-form demodulation versions as a default for all situations. As a further option, various versions may be recommended according to current parameters such as the energy density and time-frequency properties of current interference.

As a further option, artificial intelligence (AI) or machine learning may be used to prepare an algorithm, which is configured to select a particular demodulation reference version according to the messaging situation. To prepare such an algorithm, a large number of messaging events may be tracked (or recorded or analyzed) by one or more base stations (or core networks or other networking entities). The data may be analyzed by an AI structure such as a neural net, which takes in input parameters and calculates output values according to a number of internal variables which are adjustable. For example, the input parameters may include the current traffic density, number of actively communicating user devices, average size of messages, amount and type of external interference, the size and type of short-form demodulation reference employed in various messaging situations, and the QoS requirements related to each message, as well as a measure of the resulting network performance. The AI structure may also take as input the expected costs, such as resource element usage, delays, subsequent message failures, and the like. The AI structure may be configured to generate outputs such as a prediction of the subsequent network performance, which may then be compared to the measured network performance, to judge how accurate the predictions are. Alternatively, the outputs may include a suggested format of a short-form demodulation reference according to current conditions, which users and base stations may then employ. The AI structure may also compare the costs and advantages of the standard 5G/6G DMRS reference to the various formats of short-form demodulation references, and may thereby address a greater range of use cases. The variables may then be varied to optimize, or at least improve, the accuracy of the outputs or predictions.

An algorithm may be derived from the AI structure when the outputs have achieved a sufficient accuracy. The algorithm may be the AI structure itself, or the AI structure condensed by freezing the variables and excising any inputs and internal functions that have demonstrated little effect on the outputs, for example. Alternatively, an algorithm may be prepared to mimic the AI outputs according to the input values, but using a different and preferably simpler calculation technique, such as an analytic function or a computer program or an interpolation table, among many other envisioned calculation options. The algorithm may then be provided to base stations and user devices so that they may make optimal, or at least improved, decisions regarding demodulation references according to the situation.

The algorithm may also provide assistance to the transmitter, in deciding which type of short-form demodulation reference to use, and how often to include them in the message. For example, the algorithm may take as input a measure of the interference levels observed at the transmitter, other measures of interference measured by the receiving entity and communicated to the transmitter, a previously-determined level of noise in the transmission process, a previously-determined level of noise in the receiver and communicated to the transmitter, the spectrum of variations in noise or interference versus time or frequency or both, among other possible considerations. The algorithm may further include receiver preferences, such as requiring high reliability rather than low latency, or vice versa. The length of the message, the number of competing users, the expected traffic density and other network parameters may also contribute to the algorithm's determination.

Due to the potentially large number of inputs and adjustable variables in the model, and the very large amount of training data likely needed for convergence of the model, the AI structure is preferably prepared in a supercomputer. The supercomputer may be a classical semiconductor-based computer, with sufficient speed and thread count and processor count to perform the model training in a feasible amount of time. Alternatively, the supercomputer may be a quantum computer having "qbits" or quantum bits as its working elements. Quantum computers may provide special advantages to solving AI models because they can very rapidly explore a complex terrain of values, such as the highly interrelated effects of the various inputs on the output results. Therefore, the systems and methods include a quantum computer programmed to include an AI structure and trained on network performance data and on input parameters including interference and noise parameters, message parameters, and the like as discussed above.

As a further option, a wireless standards committee may select one of the short-form demodulation reference versions as a default standard. The selection may be based, at least in part, on the artificial intelligence or machine learning structure results or the algorithm derived from it.

For a handy universal default, the embodiment of FIG. 3A, a two-point short-form demodulation reference showing the maximum and minimum phase and the maximum and minimum amplitude, is offered as an advantageous candidate for such standardization, because the receiver can calculate the remaining amplitude and phase levels of the modulation scheme using interpolation alone, with no extrapolation or logic involved, according to some embodiments. In addition, using the methods disclosed herein, the values of Nphase and Namp (if not already known to the receiver) can also be calculated from the levels exhibited in the short-form demodulation reference of FIG. 3A, thereby identifying the modulation scheme. All of the amplitude and phase levels of the modulation scheme can therefore be determined from the 2-point short-form demodulation reference using low-complexity logic and arithmetic, as described. The default short-form demodulation reference can then be transmitted periodically, or prepended to messages, or prepended and appended to messages, or interspersed multiply within longer messages.

As another possible advantage, the 2-point short-form demodulation reference, or other default, when prepended to a message, may thereby indicate exactly where the message begins, and also whether the message is frequency-spanning or time-spanning, thereby greatly simplifying detection of incoming messages. For example, the receiver can scan the active bandwidth for the characteristic code of the short-form demodulation reference, such as (1111 0000) representing the maximum amplitude and phase, followed by the minimum amplitude and phase, of the two reference elements as discussed above. The end of the message may be indicated by an ending configurations such as (0000 1111). By finding those characteristic patterns, the receiver may determine the starting and ending points of the message. In 5G and 6G, it is generally difficult for user devices to determine the starting point of a message, absent such a characteristic initial code. In addition, the orientation of the two reference elements, as time-spanning or frequency-spanning, thereby indicate whether the subsequent message is time-spanning or frequency-spanning. For example, a sidelink message may be time-spanning or frequency-spanning according to the transmitting entity's preference. In addition, the short-form demodulation reference may be advantageously employed on low-complexity or legacy channels as well as high-performance managed channels of 5G/6G, thereby providing compact and easy-to-use modulation calibration for each message. Moreover, the small size of the default short-form demodulation reference may be an enabling factor for agile interference mitigation in noisy environments, because the short short-form demodulation references may be placed liberally within messages at low cost, especially in regions with interference problems.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for demodulating a message comprising message elements, each message element modulated according to a modulation scheme comprising pulse-amplitude modulation ("PAM"), wherein the modulation scheme comprises integer Namp amplitude levels, each amplitude level comprising one of the predetermined amplitudes of the modulation scheme, the method comprising:
receiving a demodulation reference comprising integer Nref reference elements, Nref less than or equal to four, each reference element modulated according to the modulation scheme;
determining, for each reference element, a reference I-branch signal and a reference Q-branch signal at 90 degrees phase relative to the reference I-branch signal;
determining the Namp amplitude levels of the modulation scheme according to the reference I-branch signals and the reference Q-branch signals;
receiving the message;
for each message element, determining a message I-branch amplitude value and determining which of the Namp amplitude levels most closely matches the message I-branch amplitude value, and determining a message Q-branch amplitude value and determining which of the Namp amplitude levels most closely matches the message Q-branch amplitude value;
whereby each amplitude "level" is one of the amplitudes within a modulation scheme as provided by the reference I-branch and reference Q-branch signals or combinations thereof, and each amplitude "value" is an amplitude of a particular message element as measured by a receiver.

2. The method of claim 1, wherein the demodulation reference and the message are transmitted according to 5G or 6G technology.

3. The method of claim 1, wherein the determining the Namp amplitude levels comprises:
for each reference element, determining a first amplitude level of the modulation scheme according to the reference I-branch signal, and determining a second amplitude level of the modulation scheme according to the reference Q-branch signal; and
calculating one or more additional amplitude levels of the modulation scheme by mathematically combining two or more of the previously determined amplitude levels of the modulation scheme.

4. The method of claim 3, wherein:
the modulation scheme includes a largest positive amplitude level and a largest negative amplitude level;
at least one of the reference I-branch or Q-branch signals comprises the largest positive amplitude level, and at least one of the reference I-branch or Q-branch signals comprises the largest negative amplitude level.

5. The method of claim 4, wherein:
the calculating one or more additional amplitude levels of the modulation scheme comprises interpolating between the largest positive amplitude level and the largest negative amplitude level.

6. The method of claim 1, further comprising:
assigning, to each amplitude level of the modulation scheme, a binary number; and
for each message element, determining which binary number corresponds to the message I-branch amplitude value and which binary number corresponds to the message Q-branch amplitude value.

7. The method of claim 1, further comprising:
receiving or determining a predetermined ratio;
determining, from the demodulation reference, a first amplitude level of the modulation scheme;
calculating, according to the predetermined ratio and the first amplitude level of the modulation scheme, a second amplitude level of the modulation scheme; and
calculating Namp-2 intermediate amplitude levels of the modulation scheme by interpolating between the first and second amplitude levels of the modulation scheme.

8. The method of claim 7, wherein:
the calculating the second amplitude level of the modulation scheme comprises multiplying or dividing the first amplitude level by the predetermined ratio.

9. The method of claim 1, wherein:
the modulation scheme includes a largest positive amplitude level and a largest negative amplitude level;

the demodulation reference comprises exactly one reference element comprising two reference element branches at 90 degrees phase relative to each other;
one of the reference element branches is modulated according to the largest positive amplitude level and the other reference element branch is modulated according to the largest negative amplitude level; and
the determining the Namp amplitude levels comprises interpolating between the largest positive and largest negative amplitude levels.

10. The method of claim 1, further comprising:
receiving a first demodulation reference and determining a first set of Namp amplitude levels therefrom, the first demodulation reference preceding the message in time or in frequency;
receiving a second demodulation reference and determining a second set of Namp amplitude levels therefrom, the second demodulation reference following the message in time or in frequency; and
calculating a third set of Namp amplitude levels by averaging the first and second sets of Namp amplitude levels.

11. The method of claim 10, wherein:
the averaging the first and second sets of amplitude levels comprises, for each message element, interpolating between the first and second sets of amplitude levels according to a position of the message element.

12. The method of claim 10, wherein the second demodulation reference is different from the first demodulation reference.

13. Non-transitory computer-readable media in a wireless receiver containing instructions that when executed by a computing environment cause a method to be performed, the method comprising:
receiving a first demodulation reference comprising exactly one reference element, the reference element modulated according to a pulse-amplitude modulation ("PAM") modulation scheme, the modulation scheme comprising integer Namp amplitude levels including a largest positive amplitude level and a largest negative amplitude level;
determining, according to the first demodulation reference, a first reference I-branch signal and a first reference Q-branch signal at 90 degrees phase relative to the first reference I-branch signal;
determining the largest positive amplitude level according to one signal, of the first reference I-branch and Q-branch signals;
determining the largest negative amplitude level according to the other signal, of the first reference I-branch and Q-branch signals; and
determining at least one additional amplitude level by interpolating between the largest positive and negative amplitude levels.

14. The media of claim 13, the method further comprising:
receiving a message comprising message elements, each message element modulated according to the same modulation scheme as the reference element; and
for each message element:
determining a message I-branch signal, and determining, from the message I-branch signal, a message I-branch amplitude, and determining which of the Namp amplitude levels is closest to the message I-branch amplitude; and
determining a message Q-branch signal at 90 degrees phase relative to the message I-branch signal, and determining, from the message Q-branch signal, a message Q-branch amplitude; and determining which of the Namp amplitude levels is closest to the message Q-branch amplitude.

15. The media of claim 13, the method further comprising:
receiving a second demodulation reference comprising exactly one reference element;
determining, according to the second demodulation reference, a second reference I-branch signal and a second reference Q-branch signal;
determining, according to the second reference I-branch signal and the second reference Q-branch signal, a second largest positive amplitude level and a second largest negative amplitude level of the modulation scheme;
determining a third largest positive amplitude level by combining the first and second largest positive amplitude levels, and determining a third largest negative amplitude level by combining the first and second largest negative amplitude levels;
calculating the Namp amplitude levels of the modulation scheme by interpolating between the third largest positive amplitude level and the third largest negative amplitude level;
receiving a message; and
demodulating the message according to the Namp amplitude levels of the modulation scheme.

16. The media of claim 15, wherein:
the first reference I-branch signal is modulated according to the first largest positive amplitude and the first reference Q-branch signal is modulated according to the first largest negative amplitude level; and
the second reference I-branch signal is modulated according to the second largest negative amplitude and the second reference Q-branch signal is modulated according to the second largest positive amplitude level.

17. The media of claim 16, wherein:
one of the first and second demodulation references is positioned before the message in time or in frequency, and the other of the first and second demodulation references is positioned after the message in time or in frequency.

18. A wireless communication device configured to:
receive a demodulation reference comprising integer Nref resource elements, Nref greater than 1 and less than 5, each resource element modulated according to a pulse-amplitude modulation ("PAM") modulation scheme, the modulation scheme comprising integer Namp amplitude levels;
determine, according to the Nref reference elements, Nref I-branch signals and Nref Q-branch signals, the Q-branch signals offset by 90 degrees in phase from the I-branch signals;
determine, according to the Nref I-branch signals and the Nref Q-branch signals, a plurality of the amplitude levels of the modulation scheme;
determine, from the plurality of the amplitude levels so determined, one or more additional amplitude levels of the modulation scheme;
receive a message comprising message elements modulated according to the PAM modulation scheme, each message element comprising a message I-branch amplitude value and a message Q-branch amplitude value; and
compare each message I-branch amplitude value and each message Q-branch amplitude value to the Namp amplitude levels of the modulation scheme, and therein determine which amplitude level, of the Namp amplitude levels of the modulation scheme, most closely matches each message I-branch amplitude value and each message Q-branch amplitude value.

19. The device of claim 18, wherein either:

the modulation scheme is 16QAM (quadrature amplitude modulation with 16 states), Nref equals 2, and the Nref I-branch amplitude levels and the Nref Q-branch amplitude levels comprise all of the Namp amplitude levels of the modulation scheme; or the modulation scheme is 64QAM, Nref equals 4, and the Nref I-branch amplitude levels and the Nref Q-branch amplitude levels comprise all of the Namp amplitude levels of the modulation scheme; or the modulation scheme is 256QAM, Nref equals 2, and the Nref I-branch amplitude levels and the Nref Q-branch amplitude levels comprise the largest positive amplitude level, the smallest positive amplitude level, the largest negative amplitude level, and the smallest negative amplitude level, of the modulation scheme.

20. The device of claim 18, wherein:

the message includes, embedded at one or more predetermined locations, one or more interior demodulation references, each interior demodulation reference comprising exactly one reference element, the exactly one reference element comprising two branch signals at 90 degrees phase relative to each other, the two branch signals modulated according to the largest positive amplitude level and the largest negative amplitude level of the modulation scheme, respectively.

* * * * *